United States Patent
Gohara

(10) Patent No.: US 10,758,819 B2
(45) Date of Patent: Sep. 1, 2020

(54) GAME SYSTEM, NON-TRANSITORY STORAGE MEDIUM HAVING STORED THEREIN GAME PROGRAM, INFORMATION PROCESSING APPARATUS, AND GAME CONTROL METHOD

(71) Applicant: NINTENDO CO., LTD., Kyoto (JP)

(72) Inventor: Shigetoshi Gohara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 251 days.

(21) Appl. No.: 15/725,569

(22) Filed: Oct. 5, 2017

(65) Prior Publication Data
US 2018/0193736 A1    Jul. 12, 2018

(30) Foreign Application Priority Data
Jan. 6, 2017 (JP) .................................. 2017-001339

(51) Int. Cl.
*A63F 13/285* (2014.01)
*A63F 13/211* (2014.01)
(Continued)

(52) U.S. Cl.
CPC .......... *A63F 13/285* (2014.09); *A63F 13/211* (2014.09); *A63F 13/2145* (2014.09);
(Continued)

(58) Field of Classification Search
CPC .. A63F 13/285; A63F 9/24; A63F 2300/1037; A63F 2300/105; A63F 2300/302; G06F 3/016
See application file for complete search history.

(56) References Cited

U.S. PATENT DOCUMENTS 7,658,676 B2    2/2010  Ohta
8,287,377 B2   10/2012  Sato
(Continued)

FOREIGN PATENT DOCUMENTS

| JP | 2008-000345 | 1/2008 |
| JP | 2013-164845 | 8/2013 |
| JP | 2015-232786 | 12/2015 |

OTHER PUBLICATIONS

Office Action dated Aug. 13, 2019, issued in JP Application No. 2017-001339 (3 pages).

*Primary Examiner* — David L Lewis
*Assistant Examiner* — Ross A Williams
(74) *Attorney, Agent, or Firm* — Nixon & Vanderhye, P.C.

(57) ABSTRACT

A game system includes a game apparatus and left and right controllers. The game apparatus includes a swing determination unit that receives operation data from the left/right controllers and determines whether a swing input is being performed onto the left/right controllers on the basis of the received operation data, and includes a vibration data generator configured to generate vibration data such that, when the swing input is being performed onto the left controller, a vibration actuator of the left controller is caused to vibrate with a predetermined intensity and a vibration actuator of the right controller is caused to vibrate with a lower intensity, and when the swing input is being performed onto the right controller, the vibration actuator of the right controller is caused to vibrate with a predetermined intensity and the vibration actuator of the left controller is caused to vibrate with a lower intensity.

24 Claims, 15 Drawing Sheets

|  |  | LEFT CONTROLLER | |
|---|---|---|---|
|  |  | WITH SWING INPUT | WITHOUT SWING INPUT |
| RIGHT CONTROLLER | WITH SWING INPUT | LEFT CONTROLLER: HIGH INTENSITY  RIGHT CONTROLLER: HIGH INTENSITY | LEFT CONTROLLER: LOW INTENSITY  RIGHT CONTROLLER: HIGH INTENSITY |
|  | WITHOUT SWING INPUT | LEFT CONTROLLER: HIGH INTENSITY  RIGHT CONTROLLER: LOW INTENSITY | LEFT CONTROLLER: NONE  RIGHT CONTROLLER: NONE |

(51) Int. Cl.
    *A63F 13/23*     (2014.01)
    *A63F 13/24*     (2014.01)
    *A63F 13/52*     (2014.01)
    *A63F 13/30*     (2014.01)
    *A63F 13/2145*     (2014.01)
    *A63F 13/40*     (2014.01)
    *A63F 13/92*     (2014.01)
    *A63F 13/428*     (2014.01)

(52) U.S. Cl.
    CPC .............. *A63F 13/23* (2014.09); *A63F 13/24* (2014.09); *A63F 13/30* (2014.09); *A63F 13/40* (2014.09); *A63F 13/428* (2014.09); *A63F 13/52* (2014.09); *A63F 13/92* (2014.09)

(56) References Cited

U.S. PATENT DOCUMENTS

| | | | |
|---|---|---|---|
| 9,211,475 B2 | 12/2015 | Miyamoto | |
| 9,501,158 B2 | 11/2016 | Okamura et al. | |
| 9,645,646 B2 * | 5/2017 | Cowley | G06F 3/016 |
| 2011/0244963 A1 * | 10/2011 | Grant | G06F 3/011 |
| | | | 463/37 |
| 2012/0302347 A1 * | 11/2012 | Nicholson | A63F 13/24 |
| | | | 463/37 |
| 2013/0198625 A1 * | 8/2013 | Anderson | G06F 3/016 |
| | | | 715/701 |
| 2013/0207792 A1 | 8/2013 | Lim et al. | |
| 2014/0056461 A1 * | 2/2014 | Afshar | H04R 1/00 |
| | | | 381/385 |
| 2015/0356838 A1 | 12/2015 | Obana et al. | |
| 2016/0370863 A1 * | 12/2016 | Jones | G06F 3/016 |

* cited by examiner

Fig. 13

|  | LEFT CONTROLLER ||
|  | WITH SWING INPUT | WITHOUT SWING INPUT |
| --- | --- | --- |
| RIGHT CONTROLLER — WITH SWING INPUT | LEFT CONTROLLER: HIGH INTENSITY<br><br>RIGHT CONTROLLER: HIGH INTENSITY | LEFT CONTROLLER: LOW INTENSITY<br><br>RIGHT CONTROLLER: HIGH INTENSITY |
| RIGHT CONTROLLER — WITHOUT SWING INPUT | LEFT CONTROLLER: HIGH INTENSITY<br><br>RIGHT CONTROLLER: LOW INTENSITY | LEFT CONTROLLER: NONE<br><br>RIGHT CONTROLLER: NONE |

US 10,758,819 B2

GAME SYSTEM, NON-TRANSITORY STORAGE MEDIUM HAVING STORED THEREIN GAME PROGRAM, INFORMATION PROCESSING APPARATUS, AND GAME CONTROL METHOD

CROSS REFERENCE TO RELATED APPLICATION

This nonprovisional application is based on Japanese Patent Application No. 2017-001339 filed with the Japan Patent Office on Jan. 6, 2017, the entire contents of which are hereby incorporated by reference.

FIELD

The present disclosure relates to a game system with a haptic feedback function, a non-transitory storage medium having stored therein a game program, or the like.

BACKGROUND AND SUMMARY

Conventionally, there has been a known game system having a haptic feedback function. A conventional game system includes a game apparatus connected to a monitor and a controller for giving an operation instruction to the game apparatus. The controller has a built-in vibrator, driving of which causes the controller to vibrate. This configuration realizes a game that allows a user to guess a non-displayed object by a haptic stimulus in a state in which an object cannot be visually recognized on a monitor.

In the conventional game system, the vibration of the controller is controlled by turning on/off the vibrator, and it is difficult to finely adjust the detailed operation of the vibration in accordance with the details of the game. An object of the present disclosure is to provide a game system that performs feedback with different vibrations in accordance with the processing of the game.

A game system according to one aspect is a game system including an information processing apparatus, a first operation apparatus, and a second operation apparatus, in which the first operation apparatus includes: a first inertial sensor; a first vibration unit configured to vibrate with an intensity instructed from the information processing apparatus; and a first communication unit configured to transmit first operation data including data obtained from the first inertial sensor to the information processing apparatus and configured to receive first vibration data for causing the first vibration unit to vibrate from the information processing apparatus, the second operation unit includes: a second inertial sensor, a second vibration unit configured to vibrate with an intensity instructed from the information processing apparatus; and a second communication unit configured to transmit second operation data including data obtained from the second inertial sensor to the information processing apparatus and configured to receive second vibration data for causing the second vibration unit to vibrate from the information processing apparatus, and the information processing apparatus includes: a third communication unit configured to receive the first operation data from the first operation apparatus, receive the second operation data from the second operation apparatus, transmit the first vibration data to the first operation apparatus, and transmit the second vibration data to the second operation apparatus; a swing determination unit configured to determine whether a swing input is being performed onto the first operation apparatus and whether a swing input is being performed onto the second operation apparatus on the basis of the first operation data and the second operation data; and a vibration data generator configured to generate the first vibration data and the second vibration data such that, when the swing input is being performed onto the first operation apparatus, the first vibration unit is caused to vibrate with a predetermined intensity and the second vibration unit is caused to vibrate with an intensity lower than the intensity of the first vibration unit, and when the swing input is being performed onto the second operation apparatus, the second vibration unit is caused to vibrate with a predetermined intensity and the first vibration unit is caused to vibrate with an intensity lower than the intensity of the second vibration unit.

With this configuration, low intensity vibrations are generated also in the operation apparatus that is not being swung among the first operation apparatus and the second operation apparatus, allowing the user to feel vibrations in both hands, thereby achieving realistic sensation. Moreover, high intensity vibrations are generated in the operation apparatus that is swung, leading to achievement of natural feedback matching the feeling of the operation.

The vibration data generator may generate the first vibration data and the second vibration data such that the intensity of vibration is lowered with the lapse of time. With this configuration, it is possible to generate vibration also in succeeding operation.

The vibration data generator may generate the first vibration data and the second vibration data on the basis of waveform information. With this configuration, it is possible to generate complicated vibration data.

The vibration data generator may read waveform information from a waveform information storage unit storing the waveform information and generate the first vibration data and the second vibration data on the basis of the read waveform information. With this configuration, it is possible to generate the vibration data easily.

The vibration data generator may set the intensity of vibration by setting the amplitude of a waveform. With this configuration, it is possible to easily set the intensity of vibration.

The information processing apparatus may further include: a player character control unit configured to control within a virtual space a player character object on the basis of the first operation data and the second operation data and cause the player character object to perform predetermined animation in accordance with the swing input; and an image processing unit configured to generate an image of the virtual space including the player character object.

With this configuration, it is possible to control the player character object in accordance with the operation and to generate vibration corresponding to the player character object.

A game system according to another aspect is a game system including an information processing apparatus and a plurality of operation apparatuses communicably connected to the information processing apparatus, the operation apparatus including: an inertial sensor configured to output operation data corresponding to a swing; and a vibration unit configured to vibrate on the basis of vibration data transmitted from the information processing apparatus, in which the information processing apparatus includes: a swing determination unit configured to determine whether a swing input is being performed onto the operation apparatus on the basis of the operation data transmitted from the operation apparatus; and a vibration data generator configured to generate vibration data for causing the vibration unit of the operation apparatus for which it is determined that the swing input is being performed to vibrate with a predetermined intensity, and causing the vibration unit of the operation apparatus for which it is determined that the swing input is not being performed to vibrate with an intensity lower than the predetermined intensity.

With this configuration, low intensity vibrations are generated also in the operation apparatus that is not being swung among the plurality of operation apparatuses, allowing the user to feel vibration from the plurality of operation apparatuses, thereby achieving realistic sensation. Moreover, high intensity vibrations are generated in the operation apparatus that is swung, leading to achievement of natural feedback matching the feeling of the operation.

A game system according to another aspect is a game system including a plurality of operation apparatuses each of which including an inertial sensor and a vibration unit, in which the vibration unit of the operation apparatus for which it is determined that swing input is being performed on the basis of operation data from the inertial sensor is caused to vibrate with a predetermined intensity, and the vibration unit of the operation apparatus for which it is determined that swing input is not being performed on the basis of operation data from the inertial sensor is caused to vibrate with an intensity lower than the predetermined intensity.

With this configuration, low intensity vibrations are generated also in the operation apparatus that is not being swung among the plurality of operation apparatuses, allowing the user to feel vibration from the plurality of operation apparatuses, thereby achieving realistic sensation. Moreover, high intensity vibrations are generated in the operation apparatus that is swung, leading to achievement of natural feedback matching the feeling of the operation.

A non-transitory storage medium according to one aspect stores a game program for controlling game processing by a computer communicably connected with a first operation apparatus including a first inertial sensor and a first vibration unit and with a second operation apparatus including a second inertial sensor and a second vibration unit, in which the game program causes the computer to execute: a step of obtaining the first operation data obtained by the first inertial sensor and transmitted from the first operation apparatus and the second operation data obtained by the second inertial sensor and transmitted from the second operation apparatus; a step of determining whether a swing input is being performed onto the first operation apparatus and whether a swing input is being performed onto the second operation apparatus on the basis of the first operation data and the second operation data; a step of generating first vibration data and second vibration data such that, when the swing input is being performed onto the first operation apparatus, the first vibration unit is caused to vibrate with a predetermined intensity and the second vibration unit is caused to vibrate with an intensity lower than the intensity of the first vibration unit, and when the swing input is being performed onto the second operation apparatus, the second vibration unit is caused to vibrate with a predetermined intensity and the first vibration unit is caused to vibrate with an intensity lower than the intensity of the second vibration unit; and a step of outputting the first vibration data to be transmitted to the first operation apparatus and outputting the second vibration data to be transmitted to the second operation apparatus.

With this configuration, low intensity vibrations are generated also in the operation apparatus that is not being swung among the first operation apparatus and the second operation apparatus, allowing the user to feel vibrations in both hands, thereby achieving realistic sensation. Moreover, high intensity vibrations are generated in the operation apparatus that is swung, leading to achievement of natural feedback matching the feeling of the operation.

The step of generating the first vibration data and the second vibration data may generate the first vibration data and the second vibration data such that the intensity of vibration is lowered with the lapse of time. With this configuration, it is possible to generate vibration also in succeeding operation.

The step of generating the first vibration data and the second vibration data may generate the first vibration data and the second vibration data on the basis of waveform information. With this configuration, it is possible to generate complicated vibration data.

The step of generating the first vibration data and the second vibration data may read waveform information from a waveform information storage unit storing the waveform information and generate the first vibration data and the second vibration data on the basis of the read waveform information. With this configuration, it is possible to generate the vibration data easily.

The step of generating the first vibration data and the second vibration data may set the intensity of vibration by setting the amplitude of a waveform. With this configuration, it is possible to easily set the intensity of vibration.

It is allowable to cause the computer to further execute: a step of controlling within a virtual space a player character object on the basis of the first operation data and the second operation data and causing the player character object to perform predetermined animation in accordance with the swing input; and a step of generating an image of the virtual space including the player character object.

With this configuration, it is possible to control the player character object in accordance with the operation and to generate vibration corresponding to the player character object.

A non-transitory storage medium according to another aspect stores a program for controlling game processing by a computer communicably connected to a plurality of operation apparatuses each of which including an inertial sensor and a vibration unit, the program causing the computer to execute: a step of obtaining a plurality of pieces of operation data received from the plurality of operation apparatuses; a step of determining whether a swing input is being performed onto the plurality of operation apparatuses on the basis of the plurality of pieces of operation data; a step of generating vibration data for causing the vibration unit of the operation apparatus for which it is determined that the swing input is being performed to vibrate with a predetermined intensity, and causing the vibration unit of the operation apparatus for which it is determined that the swing input is not being performed to vibrate with an intensity lower than the predetermined intensity; and a step of outputting the vibration data to be transmitted to the plurality of operation apparatuses.

With this configuration, low intensity vibrations are generated also in the operation apparatus that is not being swung among the plurality of operation apparatuses, allowing the user to feel vibration from the plurality of operation apparatuses, thereby achieving realistic sensation. Moreover, high intensity vibrations are generated in the operation apparatus that is swung, leading to achievement of natural feedback matching the feeling of the operation.

An information processing apparatus according to one aspect is an information processing apparatus communicably connected with a first operation apparatus including a first inertial sensor and a first vibration unit and with a second operation apparatus including a second inertial sensor and a second vibration unit, the information processing apparatus including: a communication unit configured to receive first operation data from the first operation apparatus, receive second operation data from the second operation apparatus, transmit first vibration data to the first operation apparatus, and transmit second vibration data to the second operation apparatus; a swing determination unit configured to determine whether a swing input is being performed onto the first operation apparatus and whether a swing input is being performed onto the second operation apparatus on the basis of the first operation data and the second operation data; and a vibration data generator configured to generate the first vibration data and the second vibration data such that, when the swing input is being performed onto the first operation apparatus, the first vibration unit is caused to vibrate with a predetermined intensity and the second vibration unit is caused to vibrate with an intensity lower than the intensity of the first vibration unit, and when the swing input is being performed onto the second operation apparatus, the second vibration unit is caused to vibrate with a predetermined intensity and the first vibration unit is caused to vibrate with an intensity lower than the intensity of the second vibration unit.

With this configuration, low intensity vibrations are generated also in the operation apparatus that is not being swung among the first operation apparatus and the second operation apparatus, allowing the user to feel vibrations in both hands, thereby achieving realistic sensation. Moreover, high intensity vibrations are generated in the operation apparatus that is swung, leading to achievement of natural feedback matching the feeling of the operation.

The vibration data generator may generate the first vibration data and the second vibration data such that the intensity of vibration is lowered with the lapse of time. With this configuration, it is possible to generate vibration also in succeeding operation.

The vibration data generator may generate the first vibration data and the second vibration data on the basis of waveform information. With this configuration, it is possible to generate complicated vibration data.

The vibration data generator may read waveform information from a waveform information storage unit storing the waveform information and may generate the first vibration data and the second vibration data on the basis of the read waveform information. With this configuration, it is possible to generate the vibration data easily.

The vibration data generator may set the intensity of vibration by setting the amplitude of a waveform. With this configuration, it is possible to easily set the intensity of vibration.

It is allowable to further include: a player character control unit configured to control within a virtual space a player character object on the basis of the first operation data and the second operation data and cause the player character object to perform predetermined animation in accordance with the swing input; and an image processing unit configured to generate an image of the virtual space including the player character object.

With this configuration, it is possible to control the player character object in accordance with the operation and to generate vibration corresponding to the player character object.

An information processing apparatus according to another aspect is an information processing apparatus communicably connected to a plurality of operation apparatuses each of which including an inertial sensor and a vibration unit, the information processing apparatus including: a communication unit configured to receive operation data from the plurality of operation apparatuses and transmit vibration data to the operation apparatus; a swing determination unit configured to determine whether a swing input is being performed onto the operation apparatus on the basis of the operation data received from the operation apparatus; and a vibration data generator configured to generate the vibration data for causing the vibration unit of the operation apparatus for which it is determined that the swing input is being performed to vibrate with a predetermined intensity, and causing the vibration unit of the operation apparatus for which it is determined that the swing input is not being performed to vibrate with an intensity lower than the predetermined intensity.

A game control method according to one aspect is a method for controlling game processing by a computer communicably connected with a first operation apparatus including a first inertial sensor and a first vibration unit and with a second operation apparatus including a second inertial sensor and a second vibration unit, the method including: obtaining first operation data obtained by the first inertial sensor and transmitted from the first operation apparatus and second operation data obtained by the second inertial sensor and transmitted from the second operation apparatus; determining whether a swing input is being performed onto the first operation apparatus and whether a swing input is being performed onto the second operation apparatus on the basis of the first operation data and the second operation data; generating first vibration data and second vibration data such that, when the swing input is being performed onto the first operation apparatus, the first vibration unit is caused to vibrate with a predetermined intensity and the second vibration unit is caused to vibrate with an intensity lower than the intensity of the first vibration unit, and when the swing input is being performed onto the second operation apparatus, the second vibration unit is caused to vibrate with a predetermined intensity and the first vibration unit is caused to vibrate with an intensity lower than the intensity of the second vibration unit; and transmitting the first vibration data to the first operation apparatus and the second vibration data to the second operation apparatus.

With this configuration, low intensity vibrations are generated also in the operation apparatus that is not being swung among the plurality of operation apparatuses, allowing the user to feel vibration from the plurality of operation apparatuses, thereby achieving realistic sensation. Moreover, high intensity vibrations are generated in the operation apparatus that is swung, leading to achievement of natural feedback matching the feeling of the operation.

A game control method according to another aspect is a method for controlling game processing by a computer communicably connected with a plurality of operation apparatuses each of which including an inertial sensor and a vibration unit, the method including: obtaining a plurality of pieces of operation data received from the plurality of operation apparatuses; determining whether a swing input is being performed onto the plurality of operation apparatuses on the basis of the plurality of pieces of operation data; generating vibration data for causing the vibration unit of the operation apparatus for which it is determined that the swing input is being performed to vibrate with a predetermined intensity, and causing the vibration unit of the operation apparatus for which it is determined that the swing input is not being performed to vibrate with an intensity lower than the predetermined intensity; and transmitting the vibration data to the plurality of operation apparatuses.

With this configuration, low intensity vibrations are generated also in the operation apparatus that is not being swung among the plurality of operation apparatuses, allowing the user to feel vibration from the plurality of operation apparatuses, thereby achieving realistic sensation. Moreover, high intensity vibrations are generated in the operation apparatus that is swung, leading to achievement of natural feedback matching the feeling of the operation.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 13 is a table illustrating a table for determining the intensity of vibration;

DETAILED DESCRIPTION OF NON-LIMITING EXAMPLE EMBODIMENTS

Hereinafter, a game system according to an example of the present embodiment will be described. An example of a game system 1 in the present embodiment includes a main body apparatus (information processing apparatus, functioning as a game apparatus main body in the present embodiment) 2, a left controller 3, and a right controller 4. The left controller 3 and the right controller 4 are individually detachable from the main body apparatus 2. Specifically, it is possible to use as an integrated apparatus by attaching each of the left controller 3 and the right controller 4 to the main body apparatus 2. Moreover, the main body apparatus 2 and the left controller 3 and the right controller 4 can be used separately (refer to FIG. 2). In the following, a hardware configuration of the game system according to the present embodiment will be described first, and the control of the game system of the present embodiment will then be described.

(Explanation of Main Body Apparatus, Left Controller, and Right Controller)

Figure 1:
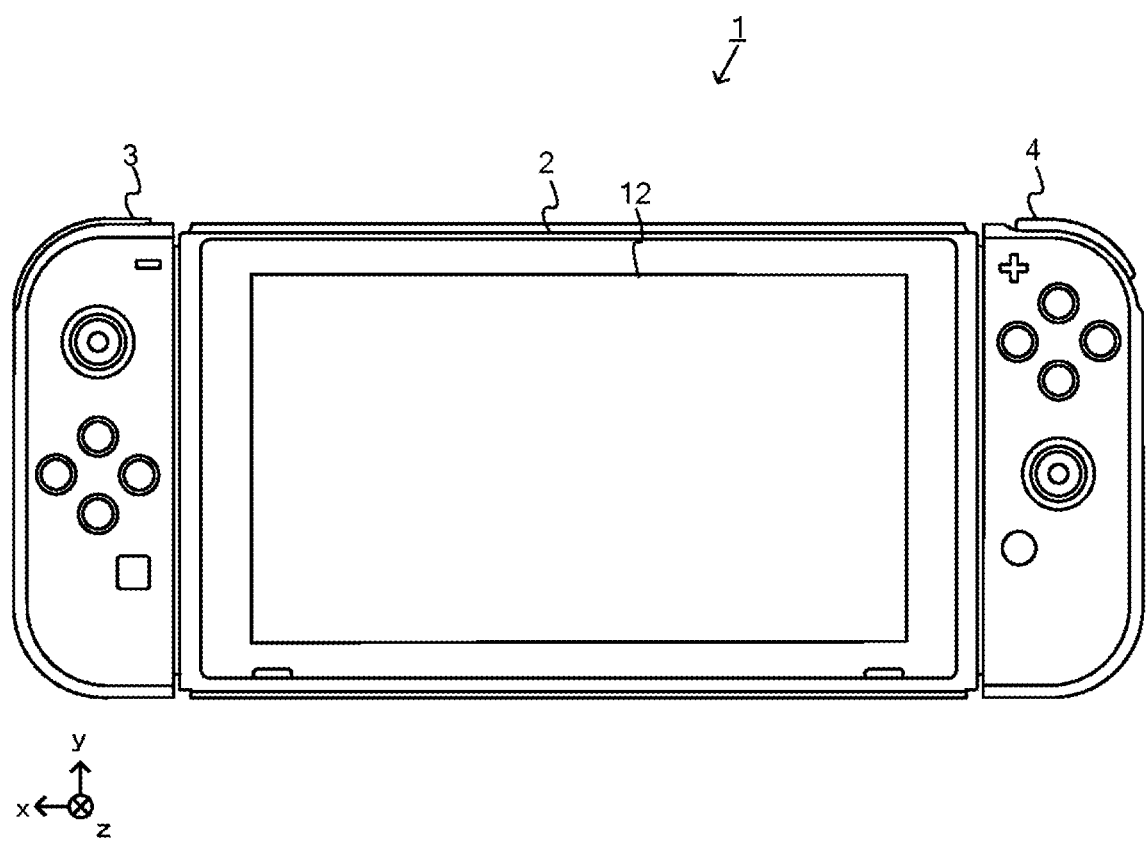
FIG. 1 is a diagram illustrating a state in which a left controller and a right controller are attached to a main body apparatus.

FIG. 1 is a diagram illustrating a state in which the left controller 3 and the right controller 4 are attached to the main body apparatus 2. As illustrated in FIG. 1, the left controller 3 and the right controller 4 are attached to and integrated with the main body apparatus 2. The main body apparatus 2 is an apparatus configured to execute various types of processing (for example, game processing) in the game system 1. The main body apparatus 2 includes a display 12. Each of the left controller 3 and the right controller 4 is an apparatus including an operation unit used by a user to perform input.

Figure 2:
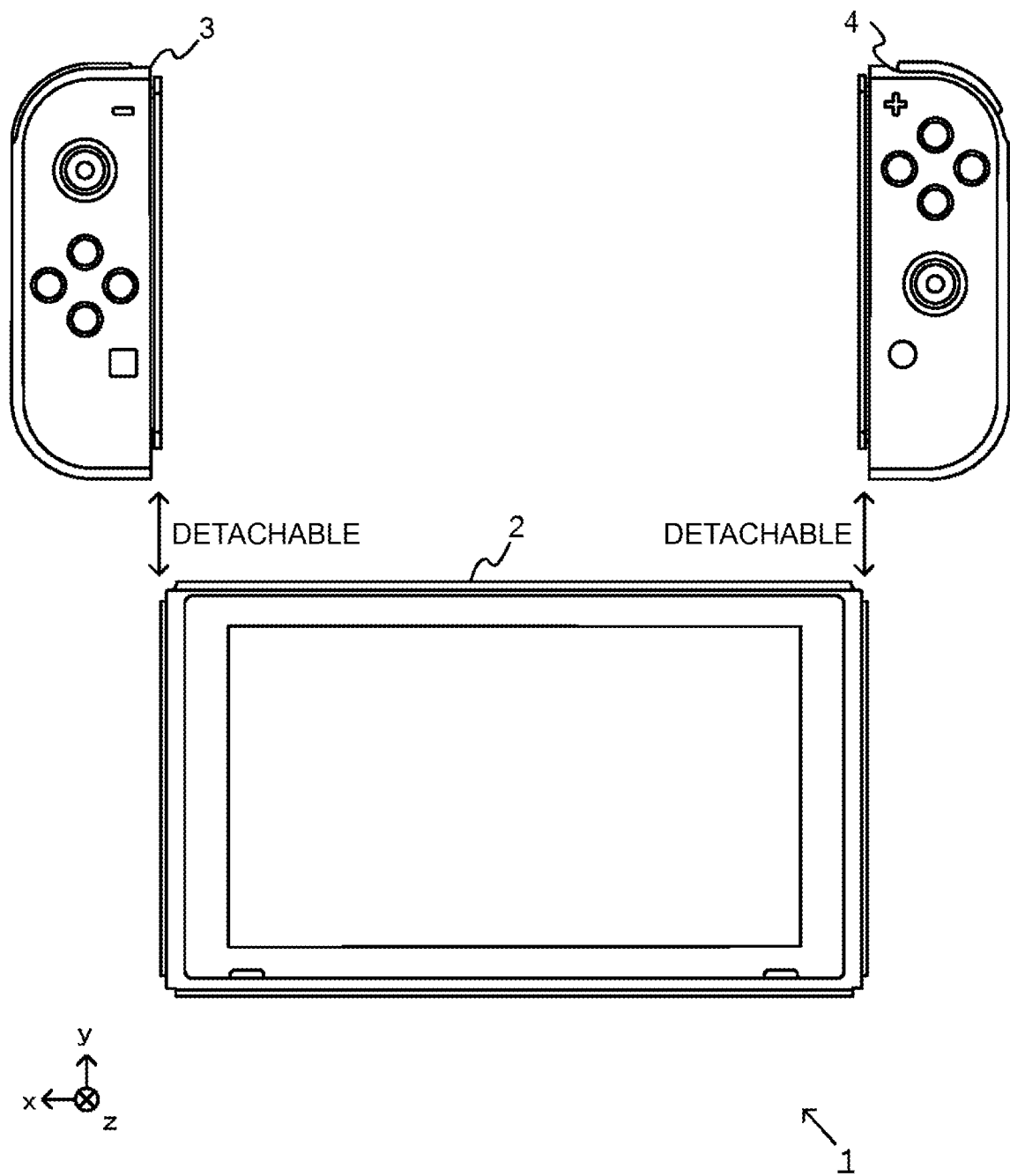
FIG. 2 is a diagram illustrating an exemplary state in which the left controller and the right controller are removed from the main body apparatus.

FIG. 2 is a diagram illustrating an exemplary state in which the left controller 3 and the right controller 4 are removed from the main body apparatus 2. As illustrated in FIGS. 1 and 2, the left controller 3 and the right controller 4 are detachable from the main body apparatus 2. In the following description, the left controller 3 and the right controller 4 will be collectively referred to as the "controller" in some cases.

Figure 3:
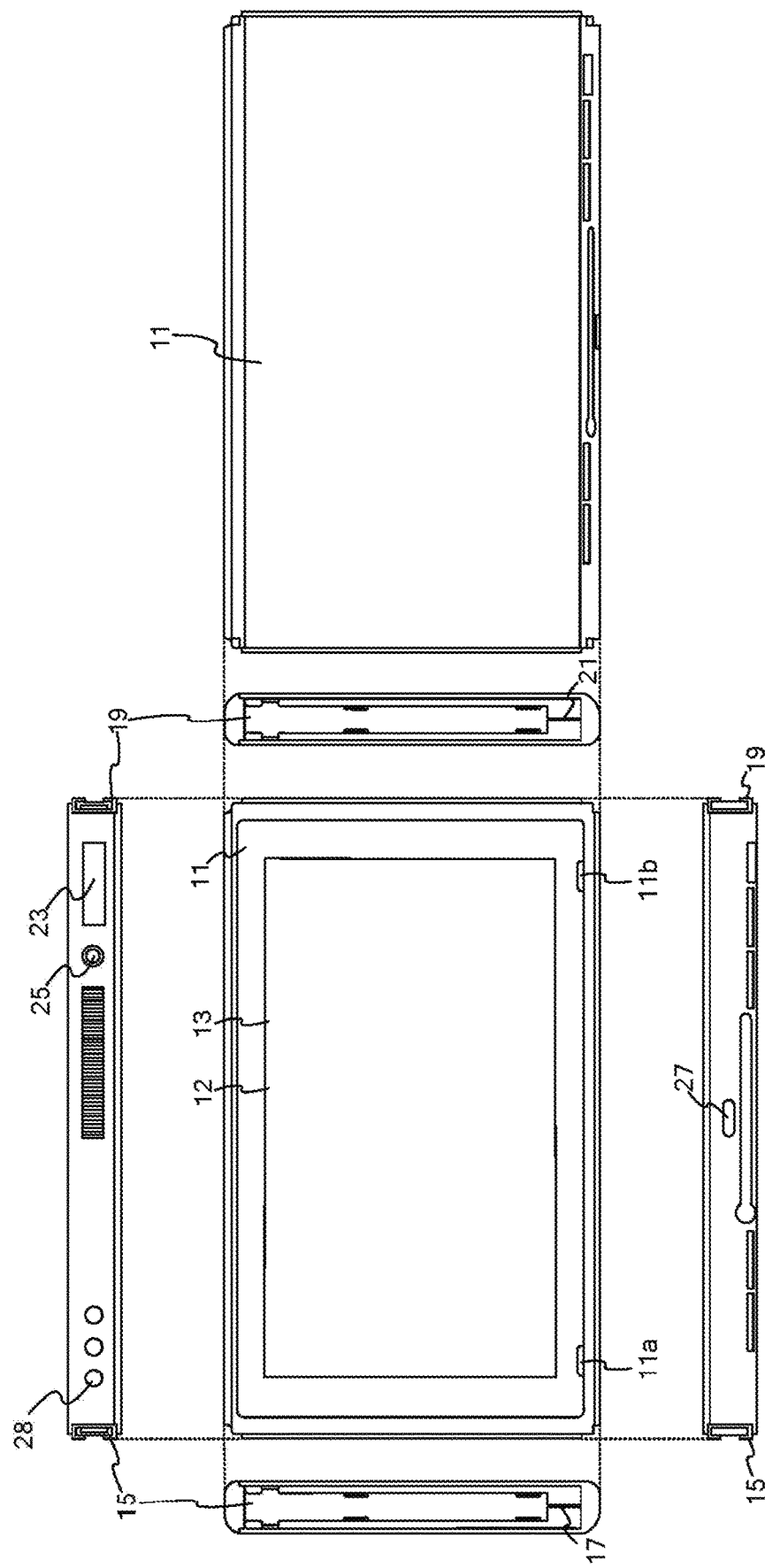
FIG. 3 is a six-sided view illustrating an example of the main body apparatus.

FIG. 3 is a six-sided view illustrating an example of the main body apparatus 2. As illustrated in FIG. 3, the main body apparatus 2 includes a substantially plate-like housing 11. In the present embodiment, a main surface of the housing 11 (in other words, a front-side surface, that is, the surface on which the display 12 is provided) is substantially rectangular in shape.

The shape and size of the housing 11 are arbitrary. For example, the housing 11 may be formed in a mobile size. Moreover, the main body apparatus 2 alone and the integrated apparatus in which the left controller 3 and the right controller 4 are attached to the main body apparatus 2 may be a mobile apparatus. The main body apparatus 2 or the integrated apparatus may be a handheld apparatus. Alternatively, the main body apparatus 2 or the integrated apparatus may be a portable apparatus.

As illustrated in FIG. 3, the main body apparatus 2 includes a display 12 provided on the main surface of the housing 11. The display 12 displays an image generated by the main body apparatus 2. In the present embodiment, the display 12 is a liquid crystal display (LCD). Note that the display 12 may be any type of display apparatus.

The main body apparatus 2 includes a touch panel 13 on a screen of the display 12. In the present embodiment, the touch panel 13 uses a system capable of multi-touch input (for example, capacitance system). Note that the touch panel 13 may use any system, for example, a system capable of single touch input (for example, resistive film system).

The main body apparatus 2 includes a speaker (that is, a speaker 88 illustrated in FIG. 6) inside the housing 11. As illustrated in FIG. 3, speaker holes 11a and 11b are formed on the main surface of the housing 11. The output sound of the speaker 88 is output from each of the speaker holes 11a and 11b.

Moreover, the main body apparatus 2 includes a left side terminal 17 as a terminal used by the main body apparatus 2 to perform wired communication with the left controller 3, and a right side terminal 21 used by the main body apparatus 2 to perform wired communication with the right controller 4.

As illustrated in FIG. 3, the main body apparatus 2 includes a slot 23. The slot 23 is provided on the upper side surface of the housing 11. The slot 23 has a shape that enables a storage medium to be attached. The storage medium is, for example, a storage medium (for example, a dedicated memory card) dedicated to the game system 1 and the information processing apparatus of the same type as the game system 1. The storage medium is used for storing, for example, one or both of the data (for example, saved data of an application) used in the main body apparatus 2 and a program (for example, an application program) executed in the main body apparatus 2. Moreover, the main body apparatus 2 includes a power button 28.

The main body apparatus 2 includes a lower terminal 27. The lower terminal 27 is a terminal used by the main body apparatus 2 to communicate with a cradle. In the present embodiment, the lower terminal 27 is a USB connector (more specifically, a female connector). When the integrated apparatus or the main body apparatus 2 alone is mounted on the cradle, the game system 1 can display an image generated and output by the main body apparatus 2, on the stationary monitor. Moreover, in the present embodiment, the cradle has a function of charging the above-described integrated apparatus or the main body apparatus 2 alone mounted on the cradle. The cradle also has a function of a hub apparatus (specifically, a USB hub).

Figure 4:
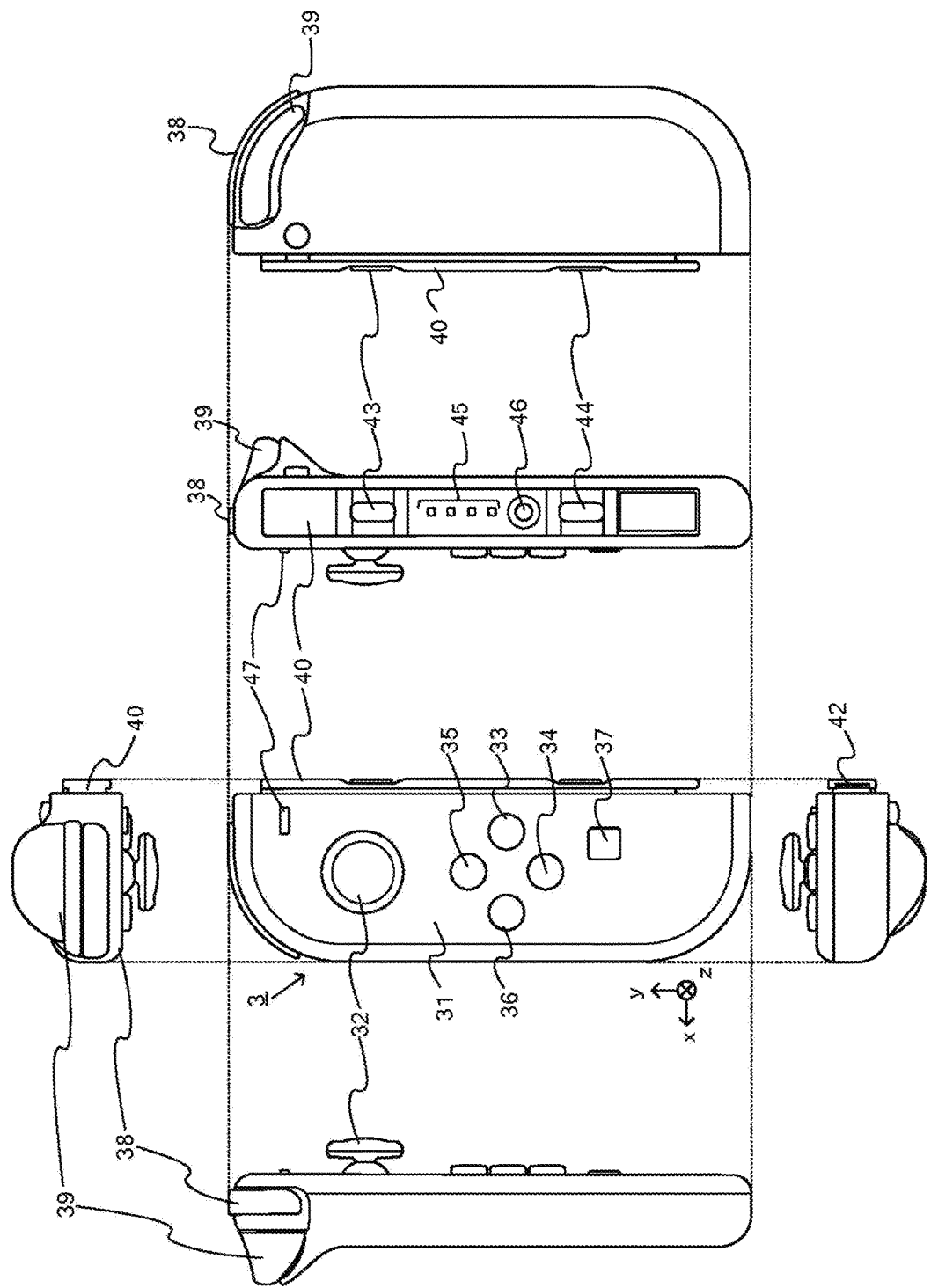
FIG. 4 is a six-sided view illustrating an example of the left controller.

FIG. 4 is a six-sided view illustrating an example of the left controller 3. As illustrated in FIG. 4, the left controller 3 includes a housing 31. In the present embodiment, the housing 31 has a vertically long shape, that is, a long shape in the vertical direction (that is, in the y-axis direction illustrated in FIG. 1). The left controller 3 can also be held in a vertically long orientation in a state detached from the main body apparatus 2. The housing 31 has a shape and size that can be held with one hand, in particular with the left hand, in a case of being held in a vertically long orientation. Moreover, the left controller 3 can also be held in a landscape orientation. In the case where the left controller 3 is held in a landscape orientation, it may be held with both hands.

The left controller 3 includes an analog stick 32. As illustrated in FIG. 4, the analog stick 32 is provided on the main surface of the housing 31. The analog stick 32 can be used as a direction input unit capable of inputting a direction. By inclining the analog stick 32, the user can input a direction corresponding to the inclination direction (and input with a size corresponding to the inclined angle). Instead of the analog stick, a cross key or a slide stick capable of slide input may be provided as the direction input unit. Moreover, an input by pressing the analog stick is possible in the present embodiment.

The left controller 3 includes various operation buttons. First, the left controller 3 includes four operation buttons 33 to 36 (specifically, a right direction button 33, a down direction button 34, an up direction button 35, and a left direction button 36) on the main surface of the housing 31. Furthermore, it has a recording button 37 and a − (minus sign) button 47. The left controller 3 includes a first L button 38 and a ZL button 39 on the upper left of the side surface of the housing 31. The left controller 3 also includes a second L button 43 and a second R button 44 on the side surface of the housing 31, the side to be attached when it is attached to the main body apparatus 2. These operation buttons are used to give instructions according to various programs (for example, OS program and application program) executed by the main body apparatus 2.

Moreover, the left controller 3 includes a terminal 42 used by the left controller 3 to perform wired communication with the main body apparatus 2.

Figure 5:
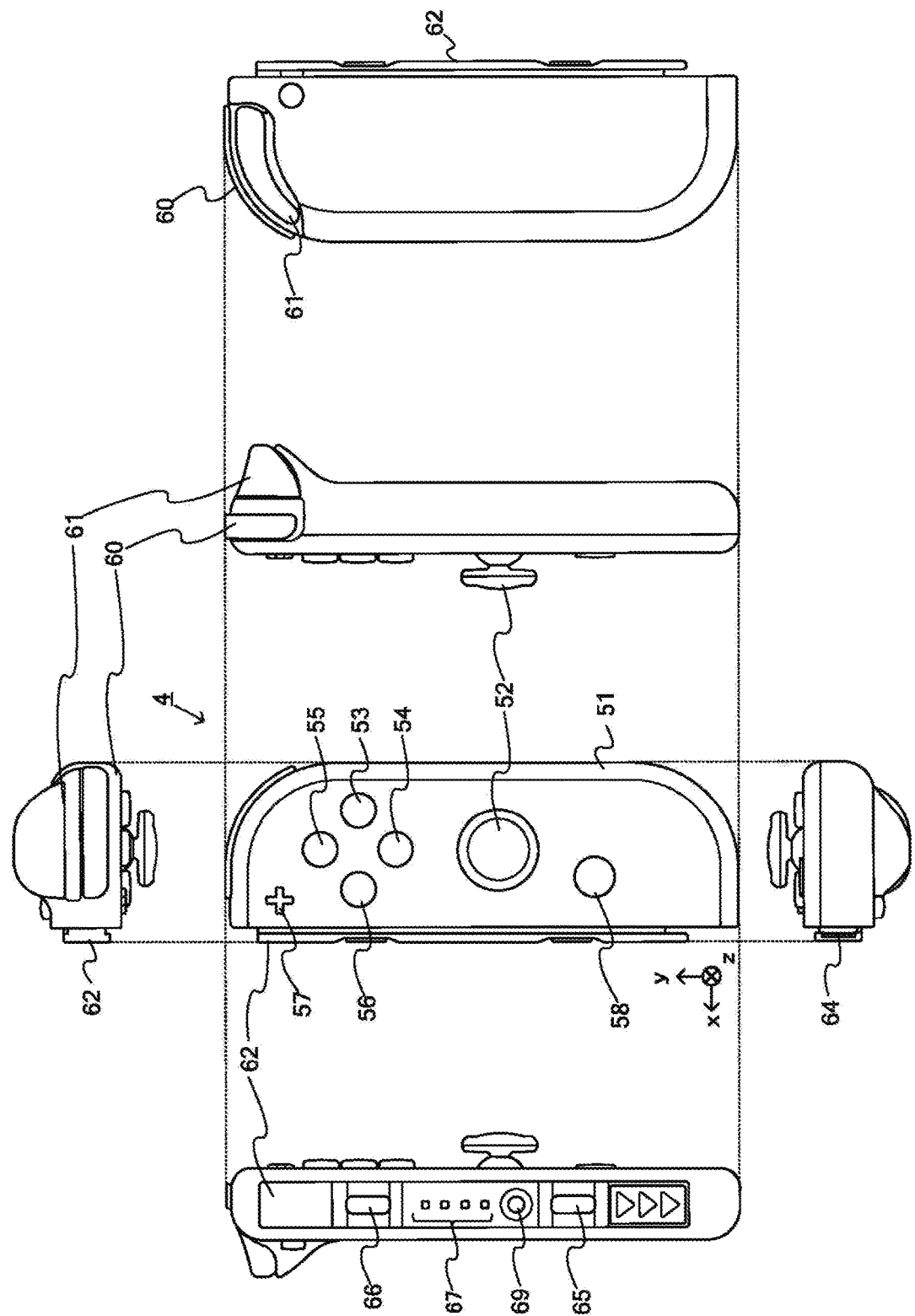
FIG. 5 is a six-sided view illustrating an example of the right controller.

FIG. 5 is a six-sided view illustrating an example of the right controller 4. As illustrated in FIG. 5, the right controller 4 includes a housing 51. In the present embodiment, the housing 51 has a vertically long shape, that is, a long shape in the vertical direction. The right controller 4 can also be held in a vertically long orientation in a state detached from the main body apparatus 2. The housing 51 has a shape and size that can be held with one hand, in particular with the right hand, in a case of being held in a vertically long orientation. Moreover, the right controller 4 can also be held in a landscape orientation. In the case where the right controller 4 is held in a landscape orientation, it may be held with both hands.

Similarly to the left controller 3, the right controller 4 includes an analog stick 52 as a direction input unit. In the present embodiment, the analog stick 52 has the same configuration as the analog stick 32 of the left controller 3. Instead of the analog stick, a cross key or a slide stick capable of inputting a slide or the like may be provided. Similarly to the left controller 3, the right controller 4 includes four operation buttons 53 to 56 (specifically, A button 53, B button 54, X button 55, and Y button 56) on the main surface of the housing 51. Furthermore, the right controller 4 includes a + (plus sign) button 57 and a home button 58. The right controller 4 also includes a first R button 60 and a ZR button 61 on the upper right of the side surface of the housing 51. Similarly to the left controller 3, the right controller 4 includes a second L button 65 and a second R button 66.

Moreover, the right controller 4 includes a terminal 64 used by the right controller 4 to perform wired communication with the main body apparatus 2.

Figure 6:
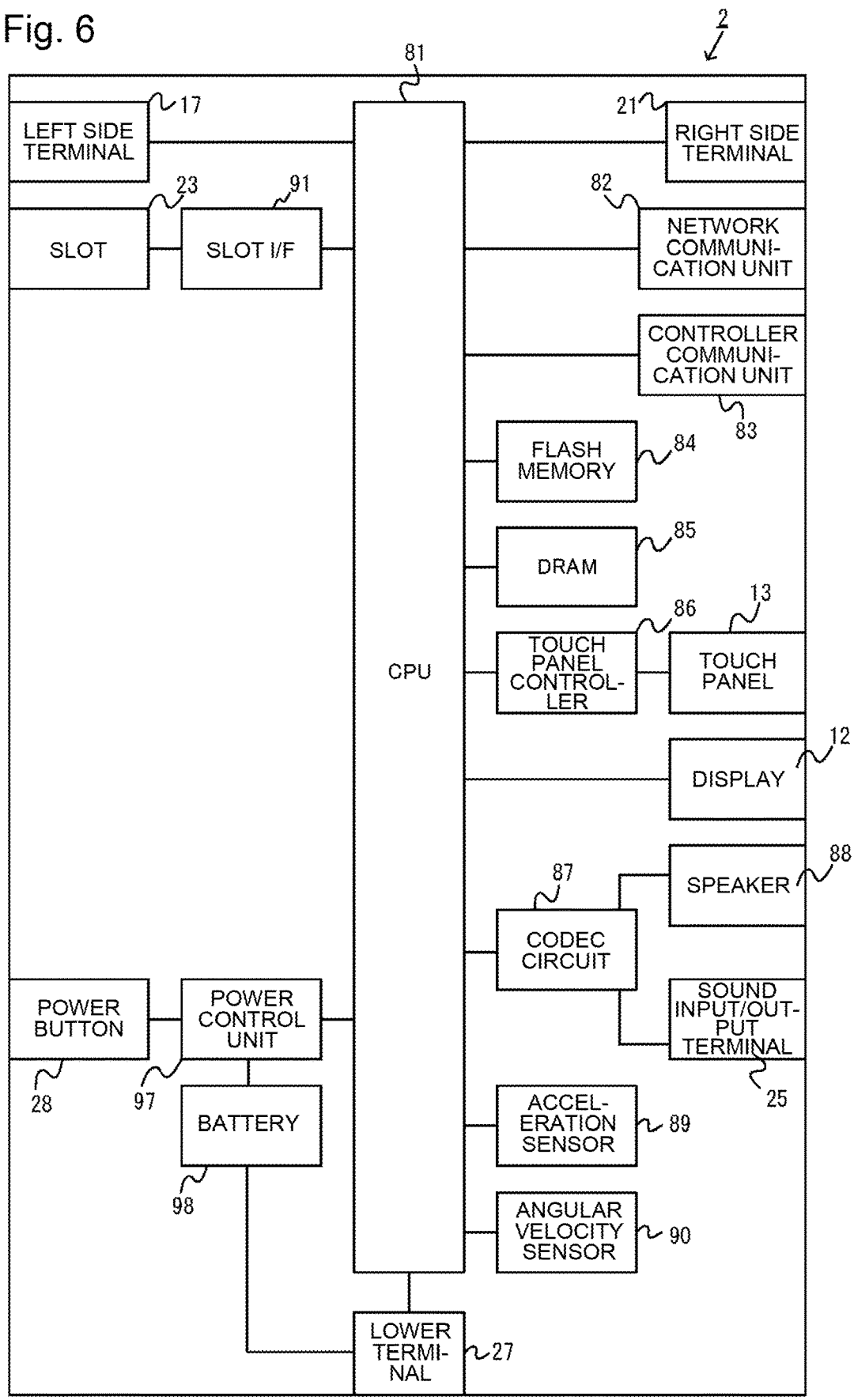
FIG. 6 is a block diagram illustrating an example of the internal configuration of the main body apparatus.

FIG. 6 is a block diagram illustrating an example of the internal configuration of the main body apparatus 2. In addition to the configuration illustrated in FIG. 3, the main body apparatus 2 includes individual components 81 to 98 illustrated in FIG. 6. Some of these components 81 to 98 may be mounted on an electronic circuit board as electronic components and stored in the housing 11.

The main body apparatus 2 includes a central processing unit (CPU) 81. The CPU 81 is an information processing unit that executes various types of information processing to be executed in the main body apparatus 2, and more particularly, is a system-on-a-chip (SoC) including a plurality of functions such as a CPU function and a GPU function. The CPU 81 executes various types of information processing by executing an information processing program (for example, a game program) stored in a storage unit (specifically, an internal storage medium such as a flash memory 84 or an external storage medium attached to the slot 23, or the like).

The main body apparatus 2 includes the flash memory 84 and a dynamic random access memory (DRAM) 85 as an exemplary internal storage medium incorporated in oneself. The flash memory 84 and the DRAM 85 are connected to the CPU 81. The flash memory 84 is mainly used for storing various data (or may be programs) stored in the main body apparatus 2. The DRAM 85 is a memory used for temporarily storing various data used in information processing.

The main body apparatus 2 includes a slot interface (hereinafter abbreviated as "I/F") 91. The slot I/F 91 is connected to the CPU 81. The slot I/F 91 is connected to the slot 23, and performs reading and writing of data from/into a storage medium (for example, a dedicated memory card) attached to the slot 23 in accordance with an instruction of the CPU 81.

The CPU 81 appropriately reads or writes data to and from the flash memory 84 and the DRAM 85 and the individual storage media, thereby executing the above-described information processing.

The main body apparatus 2 includes a network communication unit 82. The network communication unit 82 is connected to the CPU 81. The network communication unit 82 performs communication (specifically, wireless communication) with an external apparatus via a network. In the present embodiment, the network communication unit 82 communicates with an external apparatus using a wireless LAN connection with a method conforming to the Wi-Fi standard as a first communication mode. Moreover, the network communication unit 82 performs wireless communication with another main body apparatus 2 of the same type by a predetermined communication method (for example, communication based on a proprietary protocol or infrared communication) as a second communication mode. Note that the wireless communication according to the second communication mode is capable of performing wireless communication with another main body apparatus 2 arranged in a closed local network area and achieves a function enabling "local communication" of transferring data by directly communicating among a plurality of main body apparatuses 2.

The main body apparatus 2 includes a controller communication unit 83. The controller communication unit 83 is connected to the CPU 81. The controller communication unit 83 performs wireless communication with one or both of the left controller 3 and the right controller 4. While it is allowable to use any communication system between the main body apparatus 2 and the left controller 3 and between the main body apparatus 2 and the right controller 4, the present embodiment uses communication conforming to Bluetooth (registered trademark) standard to be used for communication by the controller communication unit 83 with the left controller 3 and with the right controller 4.

The CPU 81 is connected to the left side terminal 17, the right side terminal 21, and the lower terminal 27 described above. In a case of performing wired communication with the left controller 3, the CPU 81 transmits data to the left controller 3 via the left side terminal 17 and receives operation data from the left controller 3 via the left side terminal 17. Moreover, in a case of performing wired communication with the right controller 4, the CPU 81 transmits data to the right controller 4 via the right side terminal 21 and receives operation data from the right controller 4 via the right side terminal 21. Moreover, in a case of communicating with the cradle, the CPU 81 transmits data to the cradle via the lower terminal 27. In this manner, in the present embodiment, the main body apparatus 2 can perform both wired communication and wireless communication with the left controller 3 and the right controller 4. Moreover, in a case where the integrated apparatus including the left controller 3 and the right controller 4 attached to the main body apparatus 2 is attached to the cradle or where the main body apparatus 2 alone is attached to the cradle, the main body apparatus 2 can output data (for example, image data and sound data) to the stationary monitor, or the like, via the cradle.

Note that the main body apparatus 2 can communicate simultaneously (in other words, in parallel) with a plurality of left controllers 3. Moreover, the main body apparatus 2 can communicate simultaneously (in other words, in parallel) with a plurality of right controllers 4. This makes it possible to perform inputs by the user into the main body apparatus 2 using the plurality of left controllers 3 and the plurality of right controllers 4.

The main body apparatus 2 includes a touch panel controller 86 as a circuit for controlling the touch panel 13. The touch panel controller 86 is connected between the touch panel 13 and the CPU 81. The touch panel controller 86 generates, for example, data indicating a position of input of a touch input on the basis of a signal from the touch panel 13 and outputs the generated data to the CPU 81.

Moreover, the display 12 is connected to the CPU 81. The CPU 81 displays on the display 12 one or both of the generated image (for example, by executing the above information processing) and the image obtained from the outside.

The main body apparatus 2 includes a coder/decoder (codec) circuit 87 and speakers (specifically, a left speaker and a right speaker) 88. The codec circuit 87 is connected to the speaker 88 and a sound input/output terminal 25, and is also connected to the CPU 81. The codec circuit 87 is a circuit for controlling input and output of sound data to and from the speaker 88 and the sound input/output terminal 25.

The main body apparatus 2 also includes an acceleration sensor 89. In the present embodiment, the acceleration sensor 89 detects the magnitude of the acceleration in predetermined three axes (for example, the x-, y-, z-axes illustrated in FIG. 1) directions. Note that the acceleration sensor 89 may be configured to detect accelerations in one axial direction or two axial directions.

Moreover, the main body apparatus 2 includes an angular velocity sensor 90. In the present embodiment, the angular velocity sensor 90 detects an angular velocity around predetermined three axes (for example, the x-, y-, z-axes illustrated in FIG. 1). Note that the angular velocity sensor 90 may detect angular velocity about one axis or around two axes.

The acceleration sensor 89 and the angular velocity sensor 90 are connected to the CPU 81, and the detection results of the acceleration sensor 89 and the angular velocity sensor 90 are output to the CPU 81. The CPU 81 can calculate information related to one or both of the movement and posture of the main body apparatus 2 on the basis of the detection results of the acceleration sensor 89 and the angular velocity sensor 90.

The main body apparatus 2 includes a power control unit 97 and a battery 98. The power control unit 97 is connected to the battery 98 and the CPU 81. Although not illustrated, the power control unit 97 is connected to each of portions of the main body apparatus 2 (specifically, each of portions receiving the power supply of the battery 98, the left side terminal 17, and the right side terminal 21). The power control unit 97 controls power supply from the battery 98 to each of the above-described portions on the basis of a command from the CPU 81.

Moreover, the battery 98 is connected to the lower terminal 27. In a case where an external charging apparatus (for example, a cradle) is connected to the lower terminal 27 and the power is supplied to the main body apparatus 2 via the lower terminal 27, the supplied power is charged in the battery 98.

Figure 7:
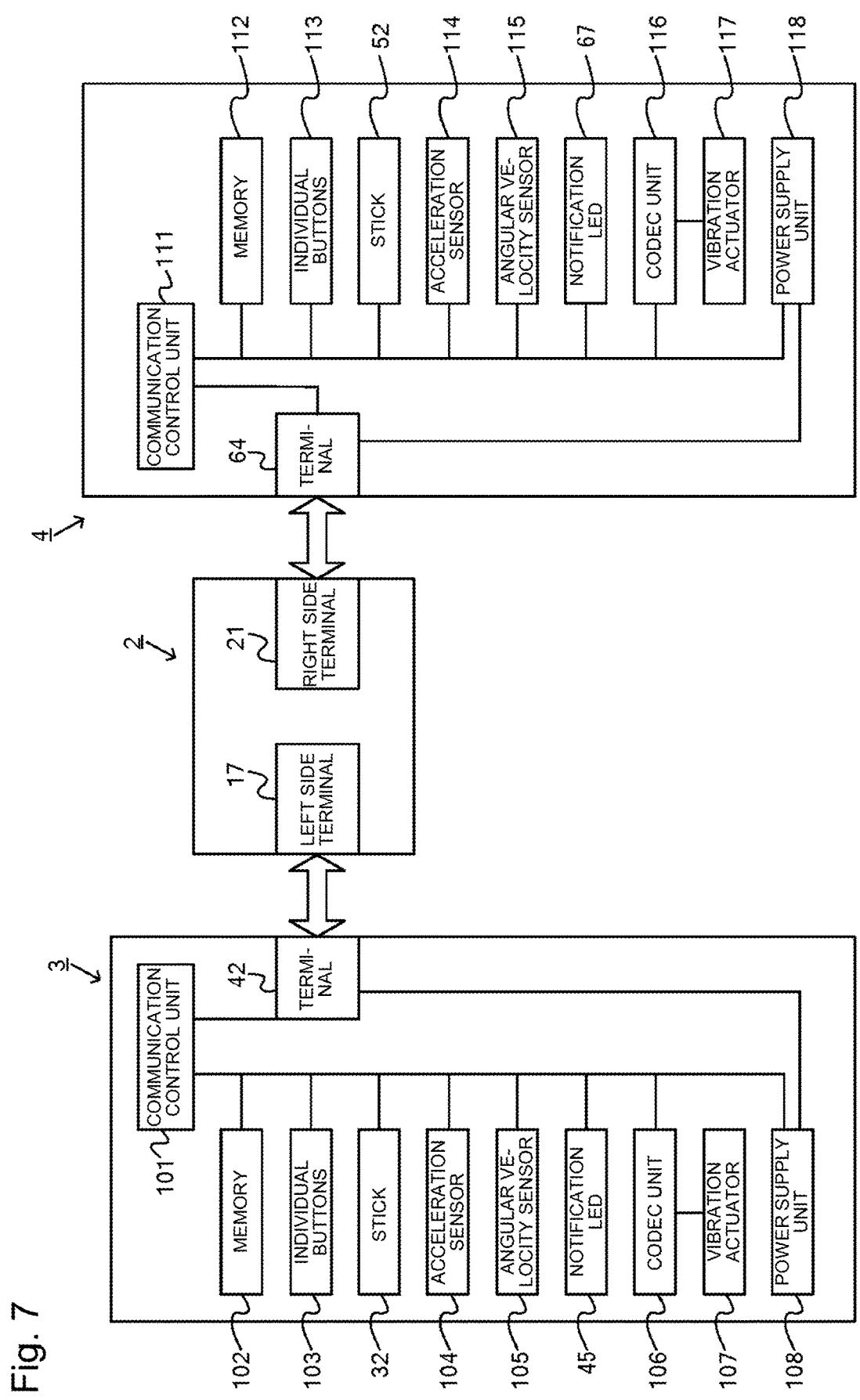
FIG. 7 is a block diagram illustrating an exemplary internal configuration of the main body apparatus, the left controller, and the right controller.

FIG. 7 is a block diagram illustrating an exemplary internal configuration of the main body apparatus 2, the left controller 3, and the right controller 4. Note that details of the internal configuration related to the main body apparatus 2 are omitted in FIG. 7 because they are illustrated in FIG. 6.

The left controller 3 includes a communication control unit 101 that communicates with the main body apparatus 2. As illustrated in FIG. 7, the communication control unit 101 is connected to each of components including the terminal 42. In the present embodiment, the communication control unit 101 can communicate with the main body apparatus 2 by both wired communication via the terminal 42 and wireless communication not via the terminal 42. The communication control unit 101 controls a communication method performed by the left controller 3 on the main body apparatus 2. That is, in a case where the left controller 3 is attached to the main body apparatus 2, the communication control unit 101 communicates with the main body apparatus 2 via the terminal 42. In contrast, in a case where the left controller 3 is detached from the main body apparatus 2, the communication control unit 101 performs wireless communication with the main body apparatus 2 (specifically, the controller communication unit 83). Wireless communication between the controller communication unit 83 and the communication control unit 101 is performed in accordance with the Bluetooth (registered trademark) standard, for example.

Moreover, the left controller 3 includes a memory 102 such as a flash memory. The communication control unit 101 is formed with, for example, a microcomputer (also referred to as a microprocessor) and executes various types of processing by executing firmware stored in the memory 102.

The left controller 3 includes individual buttons 103 (specifically, buttons 33 to 39, 43, 44, 46, and 47). The left controller 3 also includes the analog stick 32 (described as "stick" in FIG. 7). Individual buttons 103 and the analog stick 32 repeatedly output information related to the operation performed on oneself to the communication control unit 101 at an appropriate timing.

The left controller 3 includes an inertial sensor. Specifically, the left controller 3 includes an acceleration sensor 104. In addition, it includes an angular velocity sensor 105. In the present embodiment, the acceleration sensor 104 detects the magnitude of the acceleration in predetermined three axes (for example, the x-, y-, z-axes illustrated in FIG. 4) directions. Note that the acceleration sensor 104 may be configured to detect accelerations in one axial direction or two axial directions. In the present embodiment, the angular velocity sensor 105 detects an angular velocity around predetermined three axes (for example, the x-, y-, z-axes illustrated in FIG. 4). Note that the angular velocity sensor 105 may detect angular velocity about one axis or around two axes. Each of the acceleration sensor 104 and the angular velocity sensor 105 is connected to the communication control unit 101. Then, the detection results of the acceleration sensor 104 and the angular velocity sensor 105 are repeatedly output to the communication control unit 101 at an appropriate timing.

The communication control unit 101 obtains information related to the input (specifically, information related to the operation or a detection result by the sensor) from each of input units (specifically, the individual buttons 103, the analog stick 32, the sensors 104 and 105). The communication control unit 101 transmits the operation data including the obtained information (or the information obtained by performing predetermined processing on the obtained information) to the main body apparatus 2. The operation data is repeatedly transmitted at a rate of once every predetermined time. The interval at which the information related to the input is transmitted to the main body apparatus 2 may either be the same or not the same for individual input units.

With transmission of the above-described operation data to the main body apparatus 2, the main body apparatus 2 can obtain the input performed onto the left controller 3. That is, the main body apparatus 2 can distinguish the operation onto the individual buttons 103 and the analog stick 32 on the basis of the operation data. Moreover, the main body apparatus 2 can calculate information related to one or both of the movement and the posture of the left controller 3 on the basis of operation data (specifically, detection results of the acceleration sensor 104 and the angular velocity sensor 105).

The left controller 3 includes a vibration actuator 107 for notifying the user by vibration. In the present embodiment, the vibration actuator 107 is controlled by a command from the main body apparatus 2. That is, upon receiving the command from the main body apparatus 2, the communication control unit 101 drives the vibration actuator 107 in accordance with the command. The left controller 3 includes a codec unit 106. Upon receiving the above-described command, the communication control unit 101 outputs to the codec unit 106 a control signal corresponding to the command. The codec unit 106 generates a drive signal for driving the vibration actuator 107 from the control signal from the communication control unit 101 and supplies the generated signal to the vibration actuator 107. This causes the vibration actuator 107 to operate.

More specifically, the vibration actuator 107 is a linear vibrating motor. The linear vibrating motor is driven in a predetermined direction in accordance with the input voltage, unlike a normal motor that makes a rotational motion. Accordingly, the linear vibrating motor can generate vibration at the amplitude and a frequency in accordance with the waveform of the input voltage. In the present embodiment, a vibration control signal transmitted from the main body apparatus 2 to the left controller 3 may be a digital signal representing frequency and amplitude per unit time. While, in another embodiment, it is allowable to transmit information indicating the waveform itself, it would be possible to reduce the amount of communication data by transmitting amplitude and frequency alone. Moreover, in order to further reduce the data amount, it would be also allowable to transmit solely the difference from a previous value instead of the values of the amplitude and frequency at that time. In this case, the codec unit 106 converts a digital signal indicating the values of the amplitude and the frequency obtained from the communication control unit 101 into an analog voltage waveform and inputs a voltage in accordance with the waveform, thereby driving the vibration actuator 107. With this configuration, the main body apparatus 2 can control the amplitude and the frequency at which the vibration actuator 107 is vibrated at that time by changing the amplitude and frequency to be transmitted per unit time. Note that the amplitude and the frequency transmitted from the main body apparatus 2 to the left controller 3 are not limited to one, and two or more may be transmitted. In this case, the codec unit 106 can generate a waveform of the voltage for controlling the vibration actuator 107 by combining the waveforms indicated by the plurality of received amplitudes and frequencies.

The left controller 3 includes a power supply unit 108. In the present embodiment, the power supply unit 108 includes a battery and a power control circuit. Although not illustrated, the power control circuit is connected to the battery and is also connected to each of portions of the left controller 3 (specifically, each of portions receiving power supply of the battery).

As illustrated in FIG. 7, the right controller 4 includes a communication control unit 111 that communicates with the main body apparatus 2. The right controller 4 also includes a memory 112 connected to the communication control unit 111. The communication control unit 111 is connected to each of the components including the terminal 64. The communication control unit 111 and the memory 112 have the functions similar to the functions of the communication control unit 101 and the memory 102 of the left controller 3. Accordingly, the communication control unit 111 can communicate with the main body apparatus 2 in both wired communication via the terminal 64 and wireless communication not via the terminal 64 (specifically, communication conforming to the Bluetooth (registered trademark) standard) and controls the communication method performed by the right controller 4 onto the main body apparatus 2.

The right controller 4 includes individual input units similar to the individual input units of the left controller 3. Specifically, the right controller 4 includes the individual buttons 113, the analog stick 52, and an inertial sensor (an acceleration sensor 114 and an angular velocity sensor 115). Each of these input units has functions similar to individual input units of the left controller 3 and operates in the similar manner.

The right controller 4 also includes a vibration actuator 117 and a codec unit 116. The vibration actuator 117 and the codec unit 116 operate similarly to the vibration actuator 107 and the codec unit 106 of the left controller 3. That is, the communication control unit 111 causes the vibration actuator 117 to operate using the codec unit 116 in accordance with a command from the main body apparatus 2.

The right controller 4 includes a power supply unit 118. The power supply unit 118 has functions similar to the functions of the power supply unit 108 of the left controller 3 and operates in the similar manner.

(Game Control Using Each of Controllers)

In the present embodiment, the user performs a predetermined game using the game system 1. For example, the user moves a player character displayed on the display 12 of the main body apparatus 2 in the game space and performs a game of fighting against a predetermined enemy character. In the present embodiment, the user can play the game alone, or a plurality of players can play a game. In a case where the user performs a game alone, the user moves an own player character P in the game space and fights against an enemy character (non-player character) controlled by the main body apparatus 2. When playing a game by a plurality of players, a plurality of the main body apparatuses 2 communicate with each other (for example, wireless communication, communication via a LAN, or communication via the Internet), and each of the users fights by operating one's own player character.

Figure 8:
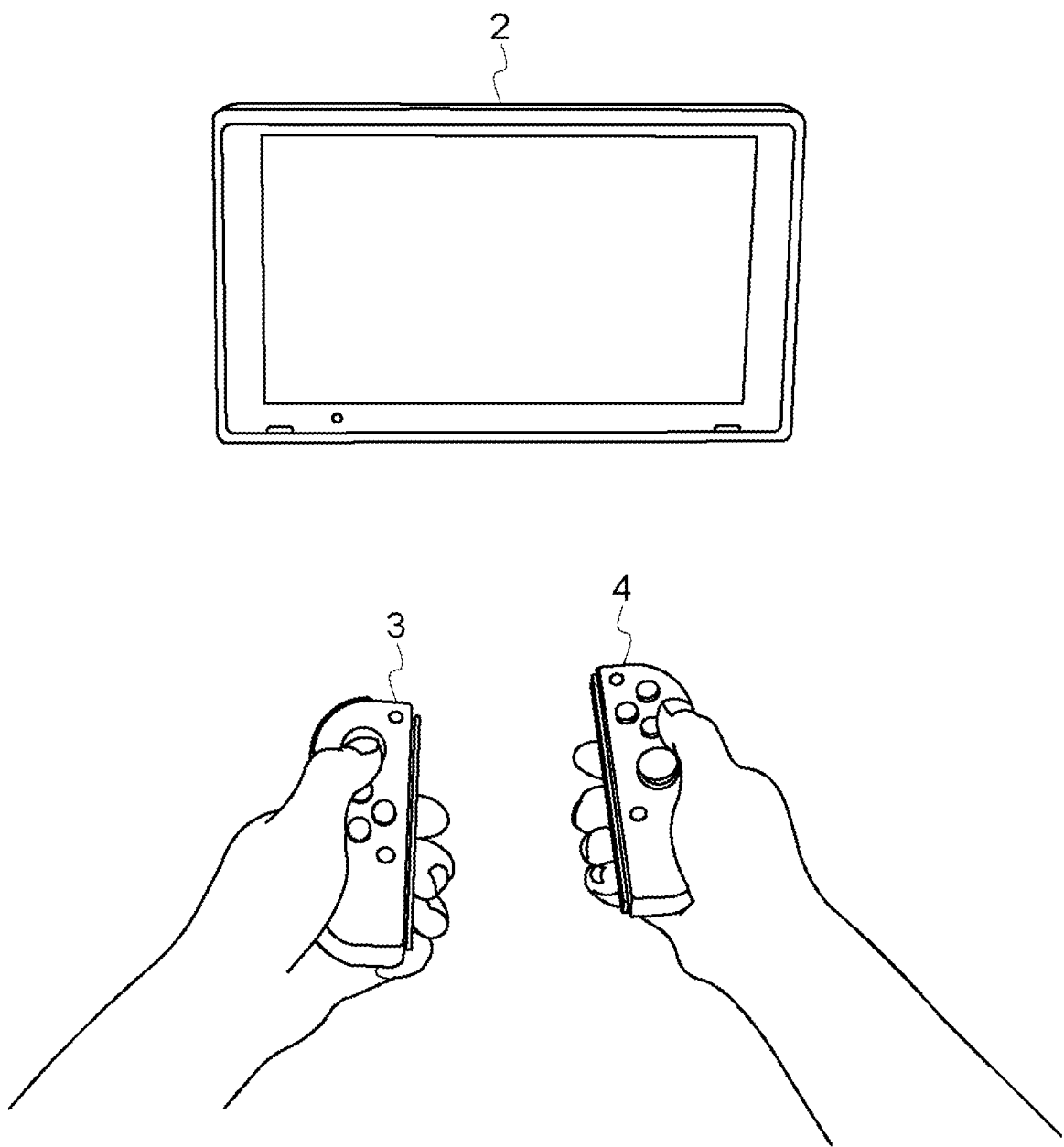
FIG. 8 is a diagram illustrating an exemplary state in which a game is played with the left controller and the right controller being removed from the main body apparatus.

In the present embodiment, the user can use the game system 1 with the left controller 3 and the right controller 4 being removed from the main body apparatus 2. FIG. 8 is a diagram illustrating an exemplary state in which a single user uses the game system 1 while holding the left controller 3 with his left hand and holding the right controller 4 with his right hand. In this case, as illustrated in FIG. 8, the positional relationship between the left controller 3 and the right controller 4 is not fixed, making it possible to move both the controllers 3 and 4 freely. Note that while the user can also perform the game operation using the left controller 3 and the right controller 4 attached to the main body apparatus 2.

(Operation Data Output from Each of Controllers)

Figure 9:
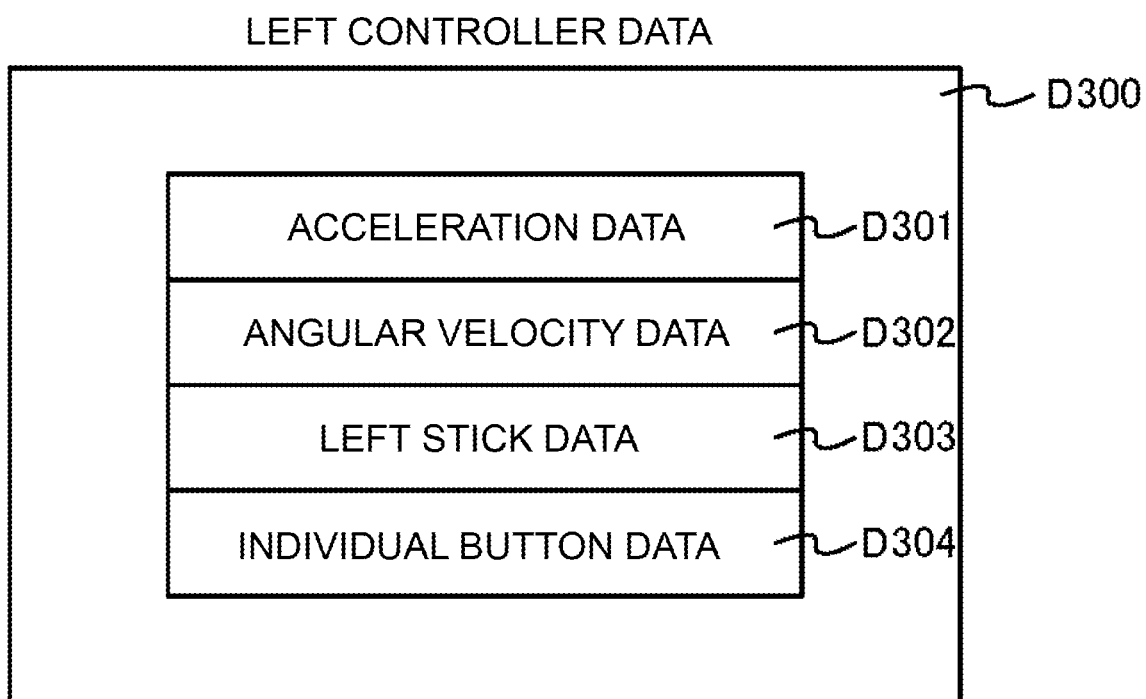
FIG. 9 is a diagram illustrating exemplary operation data output from the left controller.
Figure 10:
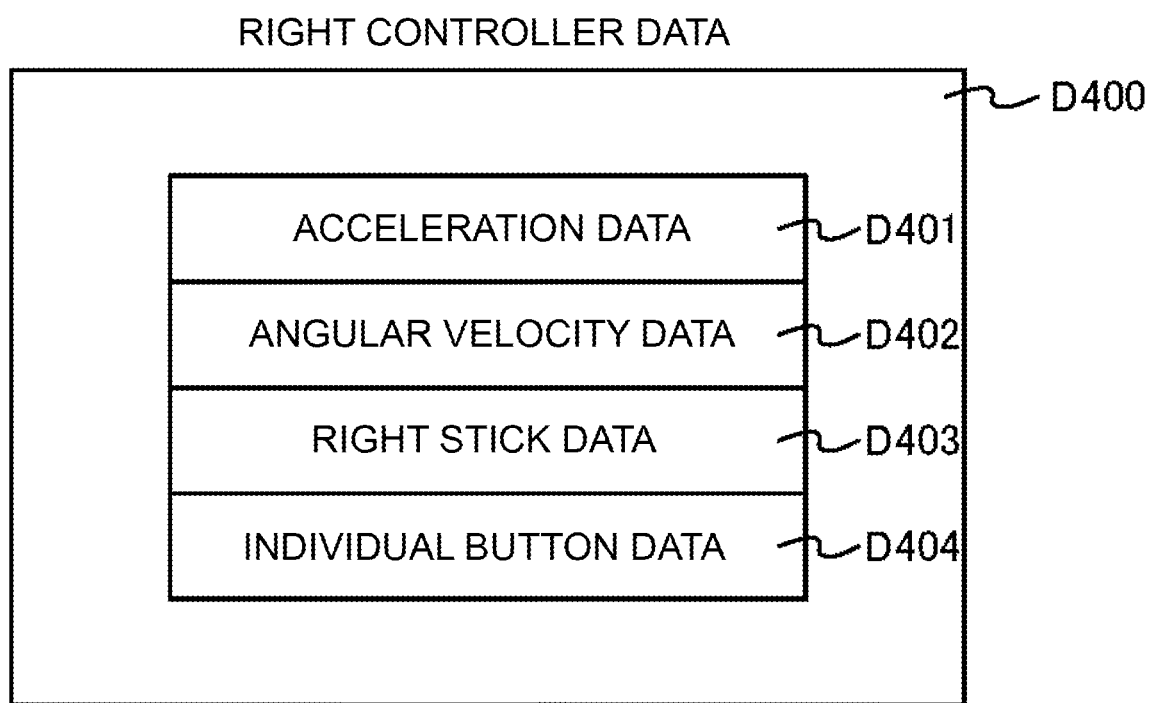
FIG. 10 is a diagram illustrating exemplary operation data output from the right controller.

Next, operation data output from each of controllers will be described. Operation data output from these controllers is obtained by the main body apparatus 2 and stored in a memory such as the DRAM 85. FIG. 9 is a diagram illustrating exemplary operation data output from the left controller 3. FIG. 10 is a diagram illustrating exemplary operation data output from the right controller 4.

As illustrated in FIG. 9, operation data D300 output from the left controller 3 includes acceleration data D301, angular velocity data D302, left stick data D303, and individual button data D304. The operation data D300 illustrated in FIG. 9 is output from the left controller 3 to the main body apparatus 2 at predetermined time intervals (for example, at 1/200 second intervals). Note that the operation data D300 illustrated in FIG. 9 is output to the main body apparatus 2 in a case where the left controller 3 is configured as the mobile apparatus controller 100 or as a wireless controller 300.

The acceleration data D301 is data indicating the value of the acceleration detected by the acceleration sensor 104. The angular velocity data D302 is data indicating the value of the angular velocity detected by the angular velocity sensor 105.

The left stick data D303 is data corresponding to operation onto the analog stick 32 and includes data indicating a direction corresponding to the inclination direction of the stick member and data indicating an inclination amount of the stick member. Moreover, as described above, the analog stick 32 is an input unit that can also perform pressing input onto the stick member. The left stick data D303 also includes data indicating whether the pressing input has been performed onto the analog stick 32.

The individual button data D304 includes data (data indicating ON or OFF) indicating whether operation onto individual buttons of the left controller 3 has been performed. For example, the individual button data 304 includes data indicating whether the operation buttons 33 to 36 are pressed, data indicating whether the recording button 37 is pressed, data indicating whether the first L button 38 is pressed, data indicating whether the ZL button 39 is pressed, and data indicating whether the − button 47 is pressed.

As illustrated in FIG. 10, operation data D400 output from the right controller 4 includes acceleration data D401, angular velocity data D402, right stick data D403, and individual button data D404. The operation data D400 illustrated in FIG. 10 is output from the right controller 4 to the main body apparatus 2 at predetermined time intervals (for example, at 1/200 second intervals). Note that the operation data D400 illustrated in FIG. 10 is output to the main body apparatus 2 in both cases where the right controller 4 is configured as the mobile apparatus controller 100 and as a wireless controller 300.

The acceleration data D401 is data indicating the value of the acceleration detected by the acceleration sensor 114. The angular velocity data D402 is data indicating a value of the angular velocity detected by the angular velocity sensor 115.

The right stick data D403 is data corresponding to operation onto the analog stick 52, and includes data indicating a direction corresponding to the inclination direction of the stick member and data indicating the inclination amount of the stick member. Moreover, as described above, the analog stick 52 is the input unit capable of performing pressing input onto the stick member. The right stick data D403 also includes data indicating whether the pressing input has been performed onto the analog stick 52.

The individual button data D404 includes data (data indicating ON or OFF) indicating whether operation onto individual buttons of the right controller 4 has been performed. For example, the individual button data D404 includes data indicating whether the operation buttons 53 to 56 are pressed, data indicating whether the home button 58 is pressed, data indicating whether the first R button 60 is pressed, data indicating whether the ZR button 61 is pressed, and data indicating whether the + button 57 is pressed.

(Game Processing Based on Operation Data)

Figure 11:
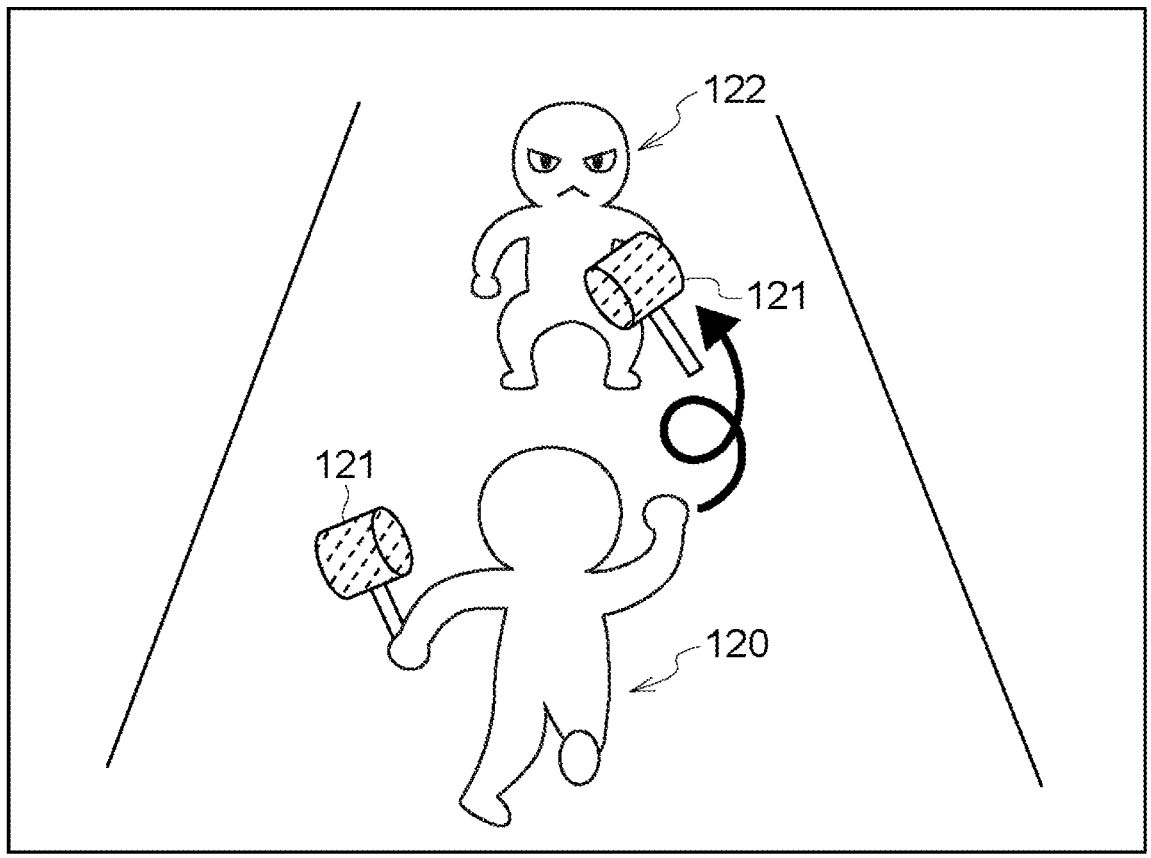
FIG. 11 is a diagram illustrating an exemplary screen of a game to be used in the present embodiment.

Hereinafter, the game control according to the present embodiment will be described. In the following description, as illustrated in FIG. 11, an exemplary game will be described in which a player character 120 within a virtual space throws a hammer 121 held with both hands towards an enemy and knocks down an enemy character 122. In this game, when a player performs operation to swing the left controller 3 and the right controller 4, the player character 120 within the virtual space throws the hammer 121. At this time, vibration actuators of the left controller 3 and the right controller 4 vibrate. In particular, when the left controller 3 is swung, the vibration actuator 107 of the left controller 3 vibrates with high intensity, and the vibration actuator 117 of the right controller 4 vibrates with lower intensity. Conversely, when the right controller 4 is swung, the vibration actuator 117 of the right controller 4 vibrates with high intensity, and the vibration actuator 107 of the left controller 3 vibrates with lower intensity. By controlling the vibration in this manner, the controller being swung vibrates with higher intensity leading to achievement of the realistic feeling in the operation and more effective vibration feedback matching the movement input. In addition, by causing also the other controller to vibrate with low intensity, it is possible to obtain a feeling that the left and right are interlocked with each other, leading to achievement of realistic feeling of controlling individual portions of one character instead of controlling separate targets, making it possible to achieve further effective vibration feedback in the game according to the present embodiment.

Figure 12:
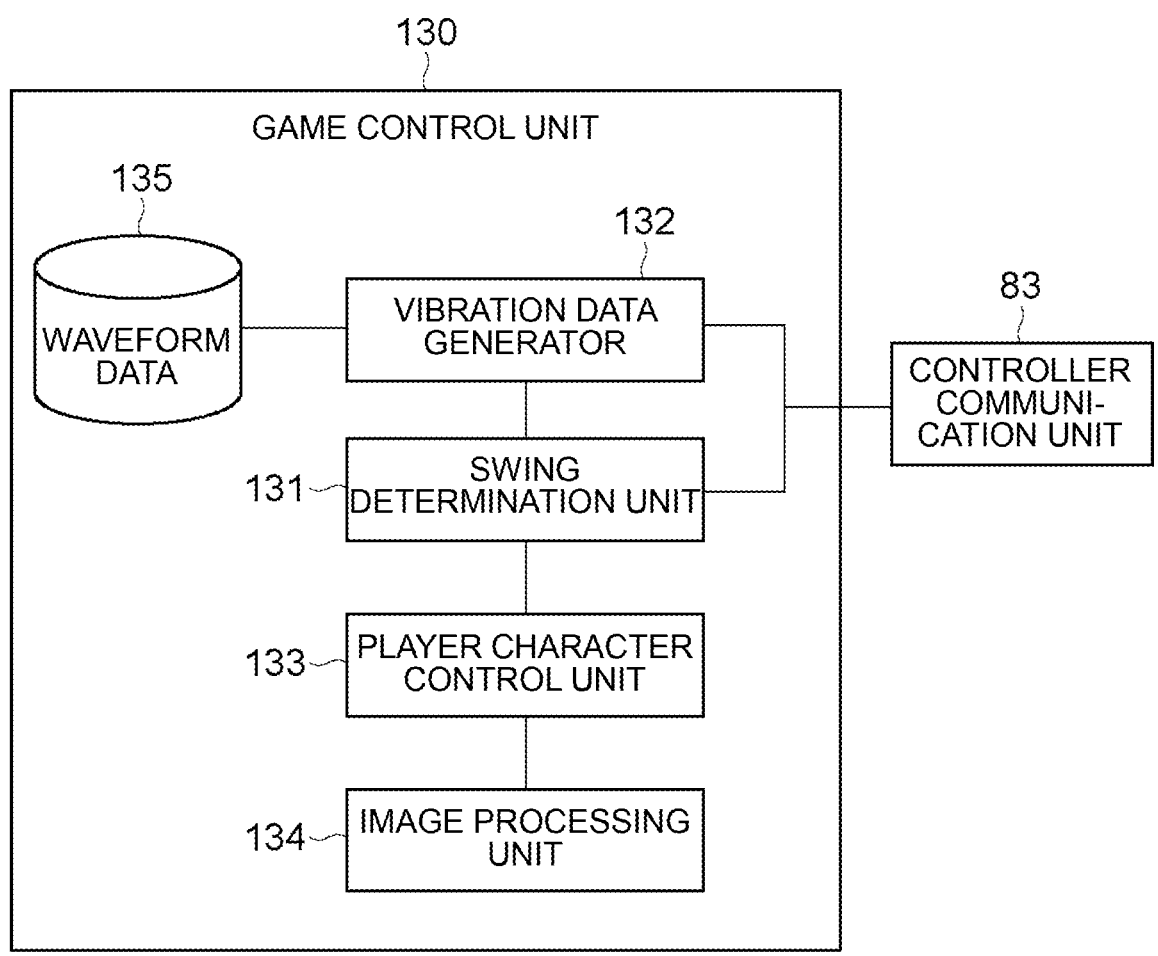
FIG. 12 is a diagram illustrating a game control unit configured to execute processing of a game system according to the present embodiment.

FIG. 12 is a diagram illustrating a game control unit 130 configured to execute processing of the game system 1 according to the present embodiment. The game control unit 130 is realized by execution by the CPU 81 of a program stored in an external storage medium attached to the first slot or in the flash memory 84, or the like. Note that while FIG. 12 illustrates the configuration necessary for the game control described in the present embodiment alone, the actual configuration includes a function for performing control according to the details of the game.

The game control unit 130 includes a swing determination unit 131, a vibration data generator 132, a player character control unit 133, and an image processing unit 134. The swing determination unit 131 determines whether the left controller 3 and the right controller 4 are swung on the basis of the acceleration data D301 and D401 among the operation data D300 and D400 of the left controller 3 and the right controller 4 obtained via the controller communication unit 83. In the present embodiment, it is determined that there is a swing in a case where each of the acceleration data D301 or D401 exceeds a predetermined threshold, and it is determined that there is no swing in a case where each of the acceleration data D301 and D401 is the predetermined threshold or below. Herein, the swing determination unit 131 determines the swing using the acceleration data D301 and D401. Alternatively, however, the swing determination may be performed using the angular velocity data D302 and D402.

The vibration data generator 132 generates vibration data for causing the vibration actuators 107 and 117 of the left controller 3 and the right controller 4 to vibrate on the basis of a determination result of the swing determination unit 131. FIG. 13 is a table illustrating a table for determining the intensity of vibration. Basically, the vibration data is generated to cause the controller determined to be swung to vibrate among the left controller 3 and the right controller 4, and to cause the controller determined to be not swung to vibrate with lower intensity than the controller determined to be swung. In a case, however, as illustrated in FIG. 13, where it is determined that there are inputs of swing in both controllers 3 and 4, processing is generated in both, and this results in generation of vibration data of causing the both to vibrate with high intensity. In a case where it is determined that there is no input of swing in any of the controllers, no vibration is to be generated.

Figure 14:
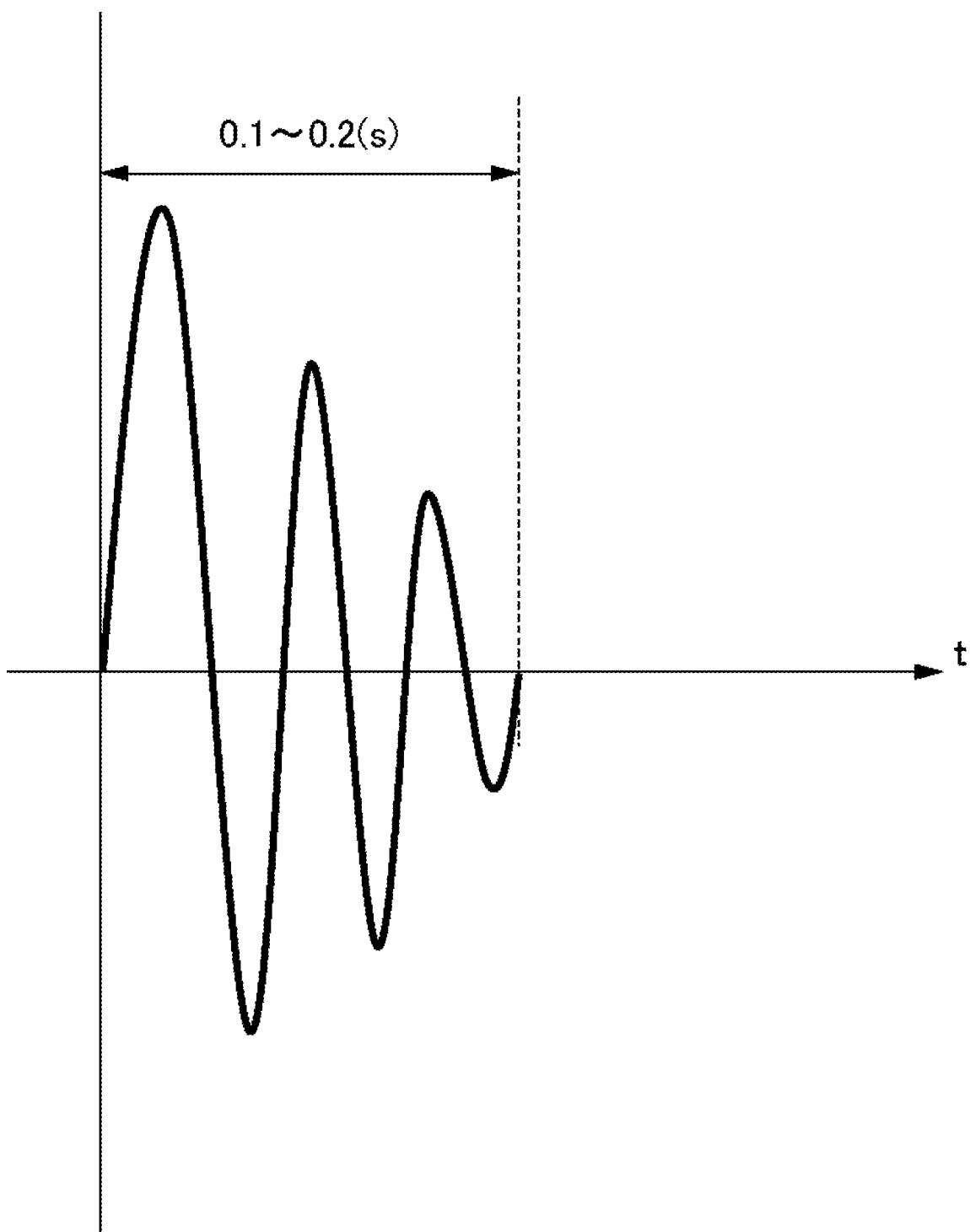
FIG. 14 is a diagram illustrating an example of waveform data stored in a waveform data storage unit.

FIG. 14 is a diagram illustrating an example of waveform data stored in the waveform data storage unit 135. The waveform data is data indicating vibration that has high intensity first and then attenuates in 0.1 to 0.2 seconds, and finally becomes zero. The vibration data generator 132 reads the waveform data from the waveform data storage unit 135 and generates the vibration data on the basis of the read waveform data. Specifically, the amplitude of the waveform data is increased in the case of generating high intensity vibration data, and the waveform data is used as it is or the amplitude is decreased in the case of generating low intensity vibration data. Note that the waveform data illustrated in FIG. 14 is an example, and various waveform data can be used in accordance with the details of the game processing. Alternatively, it is allowable to determine the frequency and the amplitude by computation instead of preparing the waveform data in advance.

The player character control unit 133 causes the player character object to perform animation on the basis of the swing determination result. For example, the animation is performed such that, the player character 120 throws the hammer 121 held with the left hand in a case where it is determined that there is a swing of the left controller 3, and the player character 120 throws the hammer 121 held with the right hand in a case where it is determined that there is a swing of the right controller 4. While the animation to be performed herein by the player character 120 is changed between the case where the left controller 3 is swung and the case where the right controller 4 is swung, it is allowable to cause the controllers to perform the same animation in the case where the left controller 3 is swung and the right controller 4 is swung.

The image processing unit 134 has a function of generating an image of the virtual space on the basis of the animation of the player character 120 determined by the player character control unit 133 and displaying the generated image on the display 12.

Figure 15:
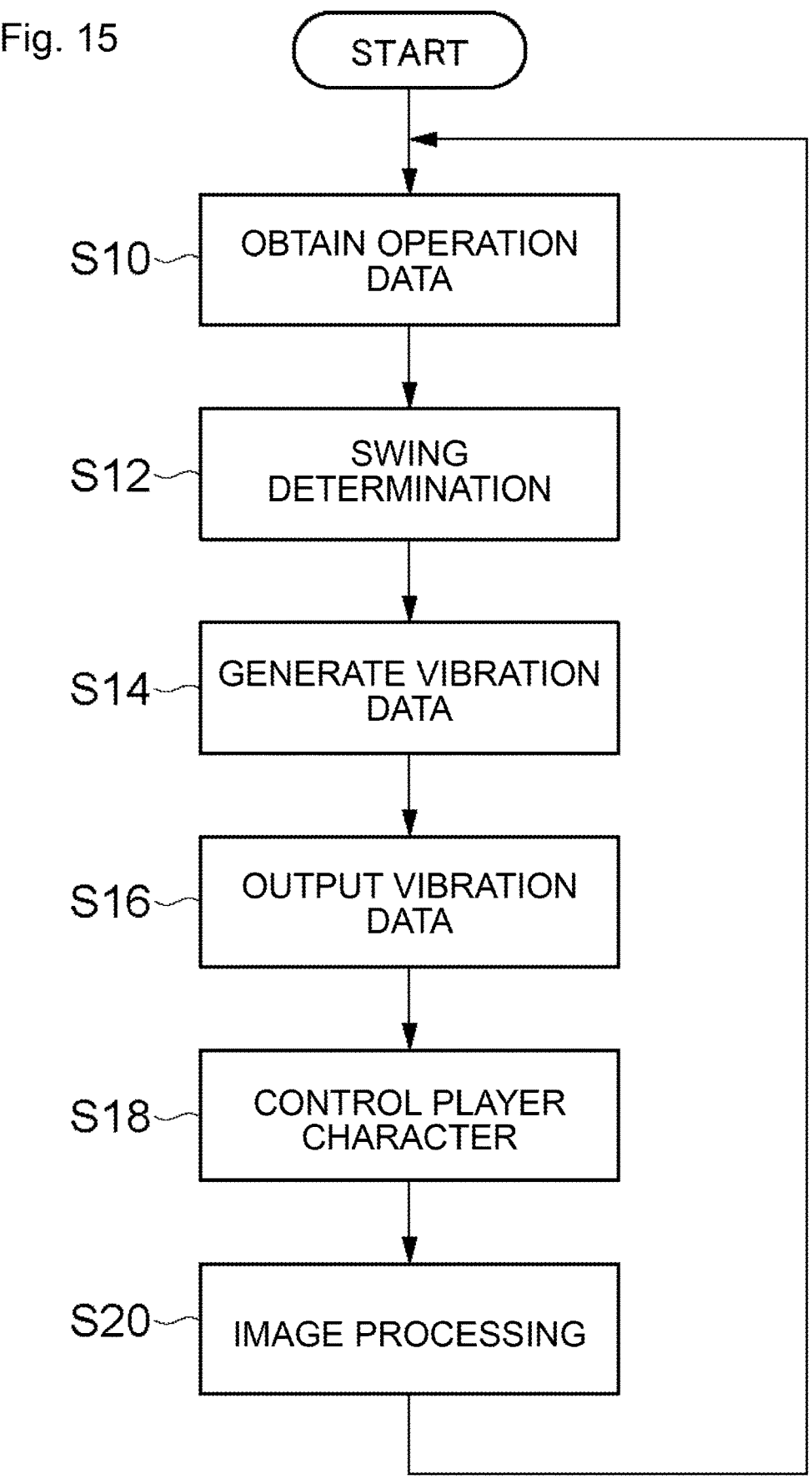
FIG. 15 is a flowchart illustrating operation of the main body apparatus according to the present embodiment.

FIG. 15 is a flowchart illustrating operation of the main body apparatus according to the present embodiment. The main body apparatus 2 realizes the game processing by executing the flowchart illustrated in FIG. 15 at a predetermined time interval (for example, 1/60 seconds).

The swing determination unit 131 of the main body apparatus 2 obtains operation data from a buffer storing operation data transmitted from the left controller 3 and the right controller 4 (S10), and performs swing determination of the left controller 3 and the right controller 4 on the basis of the obtained operation data (S12). The swing determination unit 131 passes the determination result to the vibration data generator 132 and the player character control unit 133.

On the basis of the swing determination results of the left controller 3 and the right controller 4, the vibration data generator 132 determines the intensity of the vibration data to be generated according to the table illustrated in FIG. 13, and generates vibration data (S14). Specifically, vibration data for causing the left controller 3 to vibrate and vibration data for causing the right controller 4 to vibrate are generated. The vibration data generator 132 outputs the generated vibration data to a transmission buffer for transmission to the left controller 3 and the right controller 4. The vibration data input in the transmission buffer is read out at a predetermined timing and transmitted to the left controller 3 and the right controller 4 via the controller communication unit 83.

Meanwhile, the player character control unit 133 performs player character control of determining the behavior of the player character 120 on the basis of the input swing determination result (S18). Subsequently, the image processing in the virtual space including the player character is performed on the basis of the determined control (S20), whereby the image is displayed on the display 12. The game system 1 and the game control method according to the present embodiment have been described above.

In the game system 1 according to the present embodiment, low intensity vibration occurs also in the controller not being swung among the left controller 3 and the right controller 4, allowing the user to feel vibrations in both hands, thereby achieving realistic sensation. Moreover, high intensity vibrations are generated in the controller that is swung, leading to achievement of natural feedback matching the feeling of the operation.

Moreover, the game system 1 according to the present embodiment performs image processing by controlling the vibration of the left and right controllers 3 and 4 and controlling the player character object in accordance with the result of the swing determination. With this configuration, it is possible to achieve visual feedback to the user simultaneously with haptic feedback to the user.

Hereinabove, the game system of the present embodiment has been described in detail. The embodiment described above is an exemplary case where the swing determination unit 131 determines whether swinging of the left and right controllers 3 and 4 has occurred. Alternatively, however, the swing determination unit 131 may determine the intensity of the swing and may pass the result to the vibration data generator 132 and the player character control unit 133. With this configuration, the vibration data generator 132 can change the intensity of vibration in accordance with the intensity of swing. Moreover, the player character control unit 133 can change a flying distance of the hammer in accordance with the intensity of the swing. In this manner, by changing effects of the game in accordance with the intensity of the swing on the left and right controllers 3 and 4, it is possible to enhance the game enjoyment.

Although the sound volume is not mentioned in the above embodiment, the sound volume may be controlled on the basis of the determination result by the swing determination unit 131. It would be possible to change the magnitude of the sound volume to be output on the basis of the magnitude of the swing.

The above-described embodiment is an exemplary case where the left and right controllers 3 and 4 are swung to give the feedback vibration to the left and right controllers 3 and 4. The number of operation apparatuses, however, is not limited to two but application would be possible to a game system including three or more operation apparatuses.

For example, there may be case of a game including an animation in which a player character in a virtual space shoots in response to an action of kicking a ball using a controller wound around an ankle. In this case, it is allowable to configure such that kicking with the right foot causes the controller of the right foot to vibrate with high intensity and causes the controller wound around the left foot and the controller held with both hands to vibrate with lower intensity. In this manner, in a case of having a plurality of operation apparatuses, vibration data that gives high intensity vibration is transmitted to the operation apparatus determined to have been swung, while vibration data that gives lower intensity vibration is transmitted to the operation apparatus determined to have not been swung.

While the above-described embodiment is a an exemplary case where the left and right controllers 3 and 4 are swung, this is applicable not merely to the case where the controllers 3 and 4 are swung, but also to an apparatus that performs vibration feedback in a case where the buttons of the controllers 3 and 4 are pressed. For example, in the case of operating a game character having a gun on both hands, and then the gun is fired with the right controller 4, it would be allowable to give a high intensity vibration to the right controller 4 and also give a low intensity vibration to the left controller 3.

I claim:

1. A game system comprising an information processing apparatus, a first operation apparatus, and a second operation apparatus, wherein the first operation apparatus includes:

a first inertial sensor;

a first vibration actuator configured to vibrate with an intensity instructed from the information processing apparatus; and a first communication link configured to transmit first operation data including data obtained from the first inertial sensor to the information processing apparatus and configured to receive first vibration data from the information processing apparatus for causing the first vibration actuator to vibrate, the second operation apparatus includes:

a second inertial sensor;

a second vibration actuator configured to vibrate with an intensity instructed from the information processing apparatus; and a second communication link configured to transmit second operation data including data obtained from the second inertial sensor to the information processing apparatus and configured to receive second vibration data from the information processing apparatus for causing the second vibration actuator to vibrate, and the information processing apparatus includes:

a third communication link configured to receive the first operation data from the first operation apparatus, receive the second operation data from the second operation apparatus, transmit the first vibration data to the first operation apparatus, and transmit the second vibration data to the second operation apparatus; and a processor connected to a memory, the processor executing instructions stored in the memory to perform operations comprising:

determine, by comparing outputs of the first and second inertial sensors to thresholds, whether a swing input is being performed on the first operation apparatus and whether a swing input is being performed on the second operation apparatus on the basis of the first operation data and the second operation data;

generate the first vibration data and the second vibration data in response to the swing input being performed on the first operation apparatus, and apply the first and second vibration data to the first and second vibration actuators to cause the first vibration actuator to vibrate with a predetermined intensity and to cause the second vibration actuator to vibrate with an intensity lower than the intensity of the first vibration actuator; and generate the first vibration data and the second vibration data in response to the swing input being performed on the second operation apparatus, and apply the first and second vibration data to the first and second vibration actuators to cause the second vibration actuator to vibrate with a predetermined intensity and to cause the first vibration actuator to vibrate with an intensity lower than the intensity of the second vibration actuator.

2. The game system according to claim 1,
wherein the processor generates the first vibration data and the second vibration data such that the intensity of vibration is lowered with the lapse of time.

3. The game system according to claim 1,
wherein the processor generates the first vibration data and the second vibration data on the basis of waveform information.

4. The game system according to claim 3,
wherein the processor is configured to read waveform information from a waveform information storage storing the waveform information and to generate the first vibration data and the second vibration data on the basis of the read waveform information.

5. The game system according to claim 3,
wherein the processor sets the intensity of vibration by setting the amplitude of a waveform.

6. The game system according to claim 1,
wherein the information processing apparatus further includes:
a player character controller configured to control within a virtual space a player character object on the basis of the first operation data and the second operation data; and
an image processor configured to generate an image of the virtual space including the player character object.

7. A game system comprising an information processing apparatus, and a plurality of operation apparatuses communicably connected to the information processing apparatus,
wherein the operation apparatus includes:
an inertial sensor configured to output operation data corresponding to a swing; and
a vibration actuator configured to vibrate on the basis of vibration data transmitted from the information processing apparatus, and
the information processing apparatus includes a processor configured to perform operations comprising:
determine, by comparing outputs of the inertial sensor to a threshold, whether a swing input is being performed on the operation apparatus on the basis of the operation data transmitted from the operation apparatus; and
generate vibration data for causing the vibration actuator of the operation apparatus for which it is determined that the swing input is being performed to vibrate with a predetermined intensity, and causing the vibration actuator of the operation apparatus for which it is determined that the swing input is not being performed to vibrate with an intensity lower than the predetermined intensity.

8. A game system comprising:
a plurality of operation apparatuses each of which including an inertial sensor and a vibration actuator, and
a processor operatively coupled to the plurality of operation apparatuses, the processor being configured to perform operations comprising:
receive signals from the inertial sensors of each of the plurality of operation apparatuses,
determine, in response to the received signals, if any of the plurality of operation apparatuses are being swung by comparing signals from the inertial sensors to thresholds, and
in response to the processor determining that a swing input is being performed on an operation apparatus on the basis of operation data from the inertial sensor of the operation apparatus, cause the vibration actuator of said operation apparatus to vibrate with a predetermined intensity, and causing vibration actuators of any other operation apparatuses for which it is not determined that swing input is being performed on the basis of operation data from the inertial sensors of said any other operation apparatuses to vibrate with an intensity lower than the predetermined intensity.

9. A non-transitory storage medium storing a game program for controlling a computer communicably connected with a first operation apparatus including a first inertial sensor and a first vibration actuator and with a second operation apparatus including a second inertial sensor and a second vibration actuator,
wherein the game program causes the computer to execute:
obtaining first operation data from the first inertial sensor and transmitted from the first operation apparatus, and second operation data from the second inertial sensor and transmitted from the second operation apparatus;
on the basis of the first operation data and the second operation data, determining whether a swing input is being performed on the first operation apparatus and whether a swing input is being performed on the second operation apparatus by comparing outputs of the first and second inertial sensors to thresholds;
generating first vibration data and second vibration data such that, in response to the swing input being performed on the first operation apparatus, the first vibration actuator is caused to vibrate with a predetermined intensity and the second vibration actuator is caused to vibrate with an intensity smaller than the intensity of the first vibration actuator, and in response to the swing input being performed on the second operation apparatus, the second vibration actuator is caused to vibrate with a predetermined intensity and the first vibration actuator is caused to vibrate with an intensity smaller than the intensity of the second vibration actuator; and
outputting the first vibration data to be transmitted to the first operation apparatus and outputting the second vibration data to be transmitted to the second operation apparatus.

10. The non-transitory storage medium storing a game program according to claim 9,
wherein the generating the first vibration data and the second vibration data generates the first vibration data and the second vibration data such that the intensity of vibration is lowered with the lapse of time.

11. The non-transitory storage medium storing a game program according to claim 9,
wherein generating the first vibration data and the second vibration data generates the first vibration data and the second vibration data on the basis of waveform information.

12. The non-transitory storage medium storing a game program according to claim 11,
wherein generating the first vibration data and the second vibration data reads waveform information from a waveform information storage storing the waveform information, and generates the first vibration data and the second vibration data on the basis of the read waveform information.

13. The non-transitory storage medium storing a game program according to claim 11,
wherein generating the first vibration data and the second vibration data sets the intensity of vibration by setting the amplitude of a waveform.

14. The non-transitory storage medium storing a game program according to claim 9, the game program further causing the computer to execute:
controlling within a virtual space a player character object on the basis of the first operation data and the second operation data; and
generating an image of the virtual space including the player character object.

15. A non-transitory storage medium storing a game program for controlling a computer communicably connected with a plurality of operation apparatuses each of which including an inertial sensor and a vibration actuator, wherein the game program causes the computer to execute operations comprising:
obtaining a plurality of pieces of operation data received from the plurality of operation apparatuses;
determining, by comparing an output of the inertial sensor to a threshold, whether a swing input is being performed on the plurality of operation apparatuses on the basis of the plurality of pieces of operation data;
generating vibration data for causing the vibration actuator of the operation apparatus for which it is determined that the swing input is being performed to vibrate with a predetermined intensity, and causing the vibration actuator of the operation apparatus for which it is determined that the swing input is not being performed to vibrate with an intensity lower than the predetermined intensity; and
outputting the vibration data to be transmitted to the plurality of operation apparatuses.

16. An information processing apparatus communicably connected with a first operation apparatus including a first inertial sensor and a first vibration actuator and with a second operation apparatus including a second inertial sensor and a second vibration actuator, the information processing apparatus comprising:
a communication link configured to receive first operation data from the first operation apparatus, receive second operation data from the second operation apparatus, transmit first vibration data to the first operation apparatus, and transmit second vibration data to the second operation apparatus; and
a processor configured to perform operations comprising:
determine, by comparing outputs of the first and second inertial sensors to thresholds, whether a swing input is being performed on the first operation apparatus and whether a swing input is being performed on the second operation apparatus on the basis of the first operation data and the second operation data; and
generate the first vibration data and the second vibration data such that, in response to the swing input is being performed one the first operation apparatus, the first vibration actuator is caused to vibrate with a predetermined intensity and the second vibration actuator is caused to vibrate with an intensity lower than the intensity of the first vibration actuator, and in response to the swing input is being performed onto the second operation apparatus, the second vibration actuator is caused to vibrate with a predetermined intensity and the first vibration actuator is caused to vibrate with an intensity lower than the intensity of the second vibration actuator.

17. The information processing apparatus according to claim 16,
wherein the processor is configured to generate the first vibration data and the second vibration data such that the intensity of vibration is lowered with the lapse of time.

18. The information processing apparatus according to claim 16,
wherein the processor is configured to generate the first vibration data and the second vibration data on the basis of waveform information.

19. The information processing apparatus according to claim 18,
wherein the processor is configured to reads waveform information from a waveform information storage storing the waveform information and to generate the first vibration data and the second vibration data on the basis of the read waveform information.

20. The information processing apparatus according to claim 18,
wherein the processor is configured to the intensity of vibration by setting the amplitude of a waveform.

21. The information processing apparatus according to claim 16, further comprising:
a player character controller configured to control within a virtual space a player character object on the basis of the first operation data and the second operation data; and
an image processor configured to generate an image of the virtual space including the player character object.

22. An information processing apparatus communicably connected to a plurality of operation apparatuses each of which including an inertial sensor and a vibration actuator, the information processing apparatus comprising:
a communication link configured to receive operation data from the plurality of operation apparatuses and transmit vibration data to the operation apparatus; and
a processor operatively coupled to the communication link and configured to determine, by comparing an output of the first operation apparatus inertial sensor to a threshold, whether a swing input is being performed on the operation apparatus on the basis of the operation data received from the operation apparatus;
the processor being further configured to generate the vibration data for causing the vibration actuator of the operation apparatus for which it is determined that the swing input is being performed to vibrate with a predetermined intensity, and causing the vibration actuator of any operation apparatus for which it is determined that the swing input is not being performed to vibrate with an intensity lower than the predetermined intensity.

23. A game control method for controlling game processing by a computer communicably connected with a first operation apparatus including a first inertial sensor and a first vibration actuator and with a second operation apparatus including a second inertial sensor and a second vibration actuator, the method comprising:

obtaining first operation data obtained by the first inertial sensor and transmitted from the first operation apparatus and second operation data obtained by the second inertial sensor and transmitted from the second operation apparatus;

determining, by comparing outputs of the first and second inertial sensors to thresholds, whether a swing input is being performed on the first operation apparatus and whether a swing input is being performed on the second operation apparatus on the basis of the first operation data and the second operation data;

generating first vibration data and second vibration data such that, in response to the swing input being performed on the first operation apparatus, the first vibration actuator is caused to vibrate with a predetermined intensity and the second vibration actuator is caused to vibrate with an intensity lower than the intensity of the first vibration actuator, and in response to the swing input being performed one the second operation apparatus, the second vibration actuator is caused to vibrate with a predetermined intensity and the first vibration actuator is caused to vibrate with an intensity lower than the intensity of the second vibration actuator; and transmitting the first vibration data to the first operation apparatus and transmitting the second vibration data to the second operation apparatus.

24. A game control method for controlling game processing by a computer communicably connected with a plurality of operation apparatuses each of which including an inertial sensor and a vibration actuator, the method comprising:

obtaining a plurality of pieces of operation data received from the plurality of operation apparatuses;

determining, by comparing outputs of the inertial sensors to thresholds, whether a swing input is being performed on any of the plurality of operation apparatuses on the basis of the plurality of pieces of operation data;

generating vibration data for causing the vibration actuator of an operation apparatus for which it is determined that the swing input is being performed to vibrate with a predetermined intensity, and causing the vibration actuator of an operation apparatus for which it is determined that the swing input is not being performed to vibrate with an intensity lower than the predetermined intensity; and transmitting the vibration data to the plurality of operation apparatuses.

* * * * *